(12) United States Patent
Lee et al.

(10) Patent No.: US 12,112,140 B2
(45) Date of Patent: Oct. 8, 2024

(54) ELECTRONIC DEVICE FOR OUTPUTTING TRANSLATED TEXT WITH IMPROVED ACCURACY AND CONTROL METHOD THEREOF

(71) Applicant: SAMSUNG ELECTRONICS CO., LTD., Suwon-si (KR)

(72) Inventors: Beomseok Lee, Suwon-si (KR); Hyojung Han, Suwon-si (KR); Sathish Indurthi, Suwon-si (KR); Mohd Abbas Zaidi, Suwon-si (KR); Nikhil Kumar, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 244 days.

(21) Appl. No.: 17/666,127

(22) Filed: Feb. 7, 2022

(65) Prior Publication Data

US 2022/0245364 A1   Aug. 4, 2022

Related U.S. Application Data

(63) Continuation of application No. PCT/KR2021/012265, filed on Sep. 9, 2021.

(30) Foreign Application Priority Data

Feb. 4, 2021 (KR) .................. 10-2021-0016257

(51) Int. Cl.
*G06F 40/58* (2020.01)
*G06F 3/16* (2006.01)
(Continued)

(52) U.S. Cl.
CPC .............. *G06F 40/58* (2020.01); *G06F 3/165* (2013.01); *G06F 40/289* (2020.01); *G10L 13/02* (2013.01)

(58) Field of Classification Search
CPC ......... G06F 40/58; G06F 40/289; G10L 13/02
See application file for complete search history.

(56) References Cited

U.S. PATENT DOCUMENTS 9,189,476 B2   11/2015  Kim
9,734,820 B2   8/2017   Rangarajan Sridhar et al.
(Continued)

FOREIGN PATENT DOCUMENTS

CN   111027331 B      4/2022
JP   2015-201215 A   11/2015
(Continued)

OTHER PUBLICATIONS

International Search Report (PCT/ISA/210) issued Dec. 16, 2021 by the International Searching Authority in International Patent Application No. PCT/KR2021/012265.
(Continued)

*Primary Examiner* — Bhavesh M Mehta
*Assistant Examiner* — Nandini Subramani
(74) *Attorney, Agent, or Firm* — Sughrue Mion, PLLC

(57) ABSTRACT

An electronic device includes a memory storing at least one instruction, and a processor configured to execute the at least one instruction to: input a first text into a first neural network model and acquire a first translation text; input the first translation text into a second neural network model and acquire a first liberal translation text; identify whether the first liberal translation text is to be outputted based on the first text and the first liberal translation text; output the first liberal translation text according to the identification result; based on a second text being received subsequently to the first text, input the first and second texts into the first neural network model and acquire a second translation text; and input the identification result and the second translation text into the second neural network model and acquire a second (Continued)

| STEP | TEXT | TRANSLATION TEXT | LIBERAL TRANSLATION TEXT | SENTENCE SIMILARITY VALUE | SENTENCE SUITABILITY VALUE | OUTPUT |
|---|---|---|---|---|---|---|
| 1 | 선수들이 | Athletes | Athletes | 0.7 | 0.9 | Athletes |
| 2 | 선수들이 런던 올림픽에서 | At London Olympic, athletes | Athletes at London Olympic | 0.8 | 0.8 | at London Olympic |
| 3 | 선수들이 런던 올림픽에서 약물을 | At London Olympic, athletes drugs | Athletes at London Olympic drugs | 0.7 | 0.1 | - |
| 4 | 선수들이 런던 올림픽에서 약물을 복용한다면, | If athletes take drug at London Olympic, | Athletes at London Olympic who take drug will | 0.9 | 0.8 | who take drug will |
| 5 | 선수들이 런던 올림픽에서 약물을 복용한다면, 적발될 | If athletes take drug at London Olympic, being caught | Athletes at London Olympic who take drug being caught | 0.65 | 0.4 | - |
| 6 | 선수들이 런던 올림픽에서 약물을 복용한다면, 적발될 것입니다. | If athletes take drug at London Olympic, they are likely to be caught | Athletes at London Olympic who take drug will be caught | 0.9 | 0.9 | be caught |

(Columns 3 and 4 processed by FIRST NEURAL NETWORK and SECOND NEURAL NETWORK respectively)

liberal translation text corresponding to the second translation text.

18 Claims, 14 Drawing Sheets

(51) Int. Cl.
*G06F 40/289* (2020.01)
*G10L 13/02* (2013.01)

(56) References Cited

U.S. PATENT DOCUMENTS

| | | | |
|---|---|---|---|
| 9,734,920 | B2 | 8/2017 | Sridhar et al. |
| 10,599,784 | B2 | 3/2020 | Yoo |
| 10,789,431 | B2 * | 9/2020 | Gubanov ............... G06F 40/58 |
| 10,824,820 | B2 | 11/2020 | Ahn et al. |
| 11,042,712 | B2 | 6/2021 | Prakash et al. |
| 11,328,017 | B2 | 5/2022 | Gupta et al. |
| 11,481,562 | B2 | 10/2022 | Xiong et al. |
| 11,562,152 | B2 * | 1/2023 | Arivazhagan ........... G06F 40/47 |
| 11,763,098 | B2 * | 9/2023 | Zhang .................... G06N 3/086 704/2 |
| 2008/0077391 | A1 * | 3/2008 | Chino .................... G10L 13/00 704/7 |
| 2008/0133245 | A1 | 6/2008 | Proulx et al. |
| 2020/0104371 | A1 * | 4/2020 | Ma ......................... G06F 40/42 |
| 2020/0159822 | A1 | 5/2020 | Roh et al. |
| 2020/0233927 | A1 | 7/2020 | Berger et al. |
| 2020/0372217 | A1 | 11/2020 | Abuammar et al. |
| 2020/0387676 | A1 | 12/2020 | Kim et al. |
| 2021/0174033 | A1 | 6/2021 | Xiong et al. |

FOREIGN PATENT DOCUMENTS

| | | |
|---|---|---|
| KR | 10-2013-0112654 A | 10/2013 |
| KR | 10-1827773 B1 | 2/2018 |
| KR | 10-2018-0060903 A | 6/2018 |
| KR | 10-2020-0059625 A | 5/2020 |
| KR | 10-2020-0061701 A | 6/2020 |
| KR | 10-2020-0072802 A | 6/2020 |
| KR | 10-2020-0135607 A | 12/2020 |
| WO | 2017/033063 A2 | 3/2017 |
| WO | 2017/112813 A1 | 6/2017 |

OTHER PUBLICATIONS

Written Opinion (PCT/ISA/237) issued Dec. 16, 2021 by the International Searching Authority in International Patent Application No. PCT/KR2021/012265.
European Extended Search Report issued Apr. 24, 2024 by the European Patent Office for EP Patent Application No. 21924952.1.

* cited by examiner

FIG. 2

| STEP | TEXT | TRANSLATION TEXT | | LIBERAL TRANSLATION TEXT | SENTENCE SIMILARITY VALUE | SENTENCE SUITABILITY VALUE | OUTPUT |
|---|---|---|---|---|---|---|---|
| 1 | 선수들이 | Athletes | FIRST NEURAL NETWORK | Athletes | 0.7 | 0.9 | Athletes |
| 2 | 선수들이 런던 올림픽에서 | At London Olympic, athletes | | Athletes at London Olympic | 0.8 | 0.8 | at London Olympic |
| 3 | 선수들이 런던 올림픽에서 약물을 | At London Olympic, athletes drugs | | Athletes at London Olympic drugs | 0.7 | 0.1 | – |
| 4 | 선수들이 런던 올림픽에서 약물을 복용한다면, | If athletes take drug at London Olympic, | SECOND NEURAL NETWORK | Athletes at London Olympic who take drug will | 0.9 | 0.8 | who take drug will |
| 5 | 선수들이 런던 올림픽에서 약물을 복용한다면, 적발될 | If athletes take drug at London Olympic, being caught | | Athletes at London Olympic who take drug being caught | 0.65 | 0.4 | – |
| 6 | 선수들이 런던 올림픽에서 약물을 복용한다면, 적발될 것입니다. | If athletes take drug at London Olympic, they are likely to be caught | | Athletes at London Olympic who take drug will be caught | 0.9 | 0.9 | be caught |

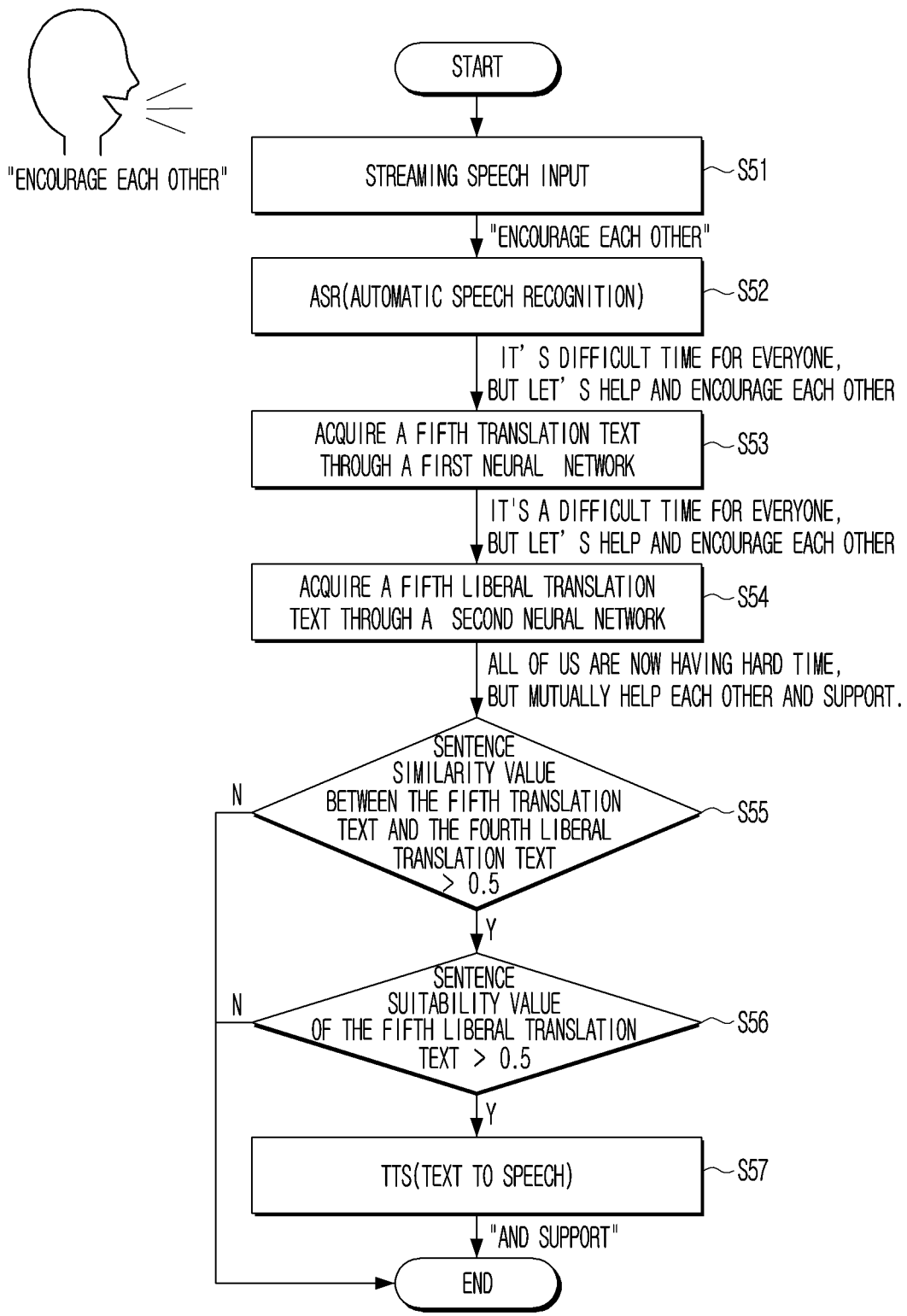

FIG. 8

| STEP | TEXT | END OF PHRASE | TRANSLATION TEXT | | LIBERAL TRANSLATION TEXT | SENTENCE SIMILARITY VALUE | SENTENCE SUITABILITY VALUE | OUTPUT |
|---|---|---|---|---|---|---|---|---|
| 1 | 우리 | N | We | | Our | 0.55 | 0.2 | - |
| 2 | 우리 모두 | N | All of us | FIRST NEURAL NETWORK | All of us | 0.7 | 0.9 | All of us |
| 3 | 우리 모두 어려운 시기 이지만 | Y | It's a difficult time for everyone, but | | All of us are now having hard time, but | 0.8 | 0.65 | are now having hard time, but |
| 4 | 우리 모두 어려운 시기 이지만, 서로를 돕고 | N | It's a difficult time for everyone, but let's help each other | SECOND NEURAL NETWORK | All of us are now having hard time, but mutually help each other | 0.9 | 0.8 | mutually help each other |
| 5 | 우리 모두 어려운 시기 이지만, 서로를 돕고 격려합시다. | Y | It's a difficult time for everyone, but let's help and encourage each other. | | All of us are now having hard time, but mutually help each other and support. | 0.9 | 0.9 | and support |

3

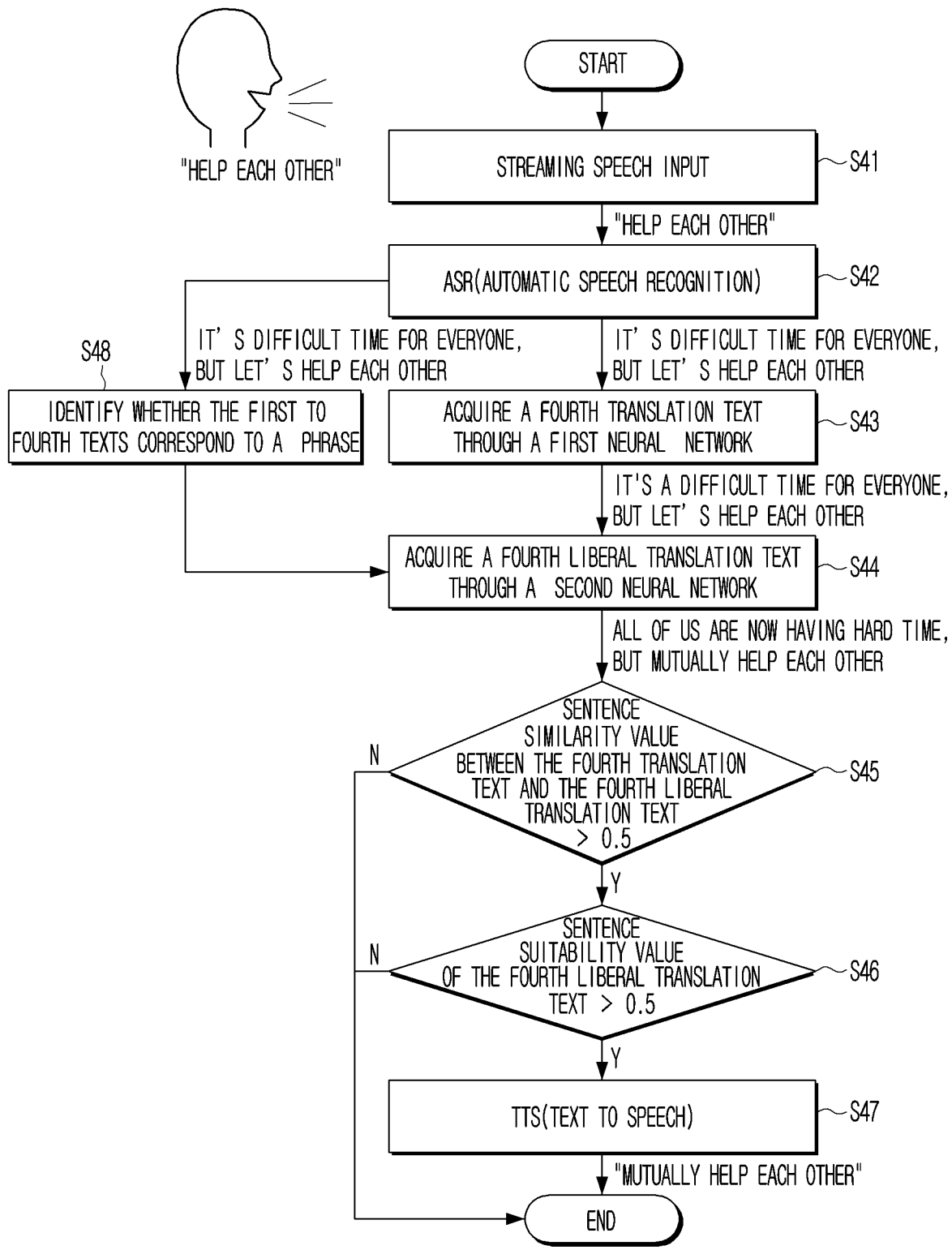

ELECTRONIC DEVICE FOR OUTPUTTING TRANSLATED TEXT WITH IMPROVED ACCURACY AND CONTROL METHOD THEREOF

CROSS-REFERENCE TO RELATED APPLICATION(S)

This application is a bypass continuation of International Application No. PCT/KR2021/012265, filed on Sep. 9, 2021, which is based on and claims priority to Korean Patent Application No. 10-2021-0016257, filed on Feb. 4, 2021, in the Korean Intellectual Property Office, the disclosures of which are incorporated by reference herein in their entireties.

BACKGROUND

1. Field

The disclosure relates to an electronic device and a control method thereof, and more particularly, to an electronic device that acquires translation texts, and a control method thereof.

2. Description of Related Art

Spurred by the development of electronic technologies, various types of electronic devices are being developed and distributed. In particular, electronic devices such as translation machines that perform translation between different languages and provide a translation result to a user are actively being developed and distributed.

However, because the performance of the translation machines in the related art is poor, it is difficult to use them in real life, and in particular, there is a problem that their real time translation performance is very poor.

For example, in the case of translating an input text in real time, there is a problem that the accuracy of translation is poor. Also, in the case of translating input texts at once after a sentence is completed instead of translating the texts in real time, there is a problem that the waiting time increases, even if the accuracy of translation can be somewhat improved.

Accordingly, there are increasing demands and discussions for a translation method for providing an electronic apparatus that may translate an input text as if in real time by decreasing the waiting time while improving the accuracy and reliability of translation.

SUMMARY

Provided are an electronic device that outputs a translation text corresponding to an input text, and a control method thereof.

According to an aspect of the disclosure, there is provided an electronic device including: a speaker; a memory configured to store at least one instruction; and a processor electronically connected with the memory and configured to, by executing the at least one instruction: input a first text in a first language into a first neural network model and acquire a first translation text corresponding to the first text, the first translation text being in a second language that is different from the first language; input the first translation text into a second neural network model and acquire a first liberal translation text corresponding to the first translation text; identifying whether the first liberal translation text is to be output based on the first text and the first liberal translation text to obtain a first identification result; control the speaker to output a sound corresponding to the first liberal translation text according to the first identification result; and based on a second text being received subsequently to the first text, input the first text and the second text into the first neural network model and acquire a second translation text corresponding to the first text and the second text; and input the first identification result and the second translation text into the second neural network model and acquire a second liberal translation text corresponding to the second translation text, and the second neural network model may be configured to: based on identifying that the first liberal translation text was previously output according to the first identification result, output the second liberal translation text corresponding to the second translation text, the second liberal translation text including the first liberal translation text, which is located in front in a word order in the second liberal translation text; and based on identifying that the first liberal translation text was not previously output, output the second liberal translation text corresponding to the second translation text.

The processor may be further configured to: acquire a sentence similarity value between the first translation text and the first liberal translation text; identify whether the first liberal translation text is to be output based on the acquired sentence similarity value; and based on the sentence similarity value being greater than or equal to a first threshold value, control the speaker to output the sound corresponding to the first liberal translation text.

The processor may be further configured to: acquire a sentence suitability value of the first liberal translation text; identify whether the first liberal translation text is to be output based on the acquired sentence suitability value; and based on the sentence suitability value being greater than or equal to a second threshold value, control the speaker to output the sound corresponding to the first liberal translation text.

The processor may be further configured to: identify whether the second liberal translation text is to be output based on the second text and the second liberal translation text to obtain a second identification result; based on identifying that the first liberal translation text was previously output, and the second liberal translation text is to be output according to the second identification result, control the speaker to output a sound corresponding to a remaining part excluding the first liberal translation text in the second liberal translation text; and based on identifying that the first liberal translation text was not previously output, and the second liberal translation text is to be output, control the speaker to output a sound corresponding to the second liberal translation text.

The processor may be further configured to: acquire a sentence similarity value between the second translation text and the second liberal translation text; acquire a sentence suitability value of the second liberal translation text; identify whether the second liberal translation text may be output based on the sentence similarity value and the sentence suitability value; and based on the sentence similarity value being greater than or equal to a third threshold value and the sentence suitability value being greater than or equal to a fourth threshold value, control the speaker to output the sound corresponding to the second liberal translation text.

The processor may be further configured to: input the first text and the second text into a third neural network model and acquire information on whether the first text and the second text correspond to a phrase; and input the second translation text and the information on whether the first text and the second text correspond to the phrase into the second neural network model and acquire the second liberal translation text corresponding to the second translation text.

The processor may be further configured to: based on identifying that the first text and the second text correspond to the phrase based on the input information, output the second liberal translation text corresponding to the second translation text and in a form of a sentence or the phrase; and based on identifying that the first text and the second text do not correspond to the phrase, output the second liberal translation text corresponding to the second translation text and in a form of an uncompleted sentence.

The second neural network model may be trained based on a plurality of texts; the plurality of texts may include: a first sentence text acquired based on at least one word selected from a plurality of respective word groups and a second sentence text of which sentence similarity value with respect to the first sentence text is greater than or equal to a fifth threshold value; and the plurality of respective word groups may include words of which sentence similarity values therebetween are greater than or equal to the fifth threshold value.

The second neural network model may be trained based on a plurality of texts; the plurality of texts may include: a first translation sentence text in the second language corresponding to a first sentence text in the first language acquired based on a parallel corpus between the first language and the second language; and a second translation sentence text in the second language acquired by inputting the first sentence text into the first neural network model, and a sentence similarity value between the first translation sentence text and the second translation sentence text may be greater than or equal to a sixth threshold value.

A most preceding word among a plurality of words constituting the first translation sentence text and a most preceding word among a plurality of words constituting the second translation sentence text may be different words from each other.

According to an aspect of the disclosure, there is provided is a control method of an electronic device, the method including: inputting a first text in a first language into a first neural network model and acquiring a first translation text corresponding to the first text, the first translation text being in a second language that is different from the first language; inputting the first translation text into a second neural network model and acquiring a first liberal translation text corresponding to the first translation text; identifying whether the first liberal translation text may be output based on the first text and the first liberal translation text to obtain a first identification result; outputting the first liberal translation text according to the first identification result; based on a second text being received subsequently to the first text, inputting the first text and the second text into the first neural network model and acquiring a second translation text corresponding to the first text and the second text; and inputting the first identification result and the second translation text into the second neural network model and acquiring a second liberal translation text corresponding to the second translation text; the second neural network model may be configured to: based on identifying that the first liberal translation text was previously output according to the first identification result, output the second liberal translation text corresponding to the second translation text, the second liberal translation text including the first liberal translation text, which is located in front in a word order in the second liberal translation text; and based on identifying that the first liberal translation text was not previously output, output the second liberal translation text corresponding to the second translation text.

The making the first identification include: acquiring a sentence similarity value between the first translation text and the first liberal translation text; and identifying whether the first liberal translation text is to be output based on the acquired sentence similarity value, and the outputting the first liberal translation text may include: based on the sentence similarity value being greater than or equal to a first threshold value, outputting the first liberal translation text.

The making the first identification may include: acquiring a sentence suitability value of the first liberal translation text; and identifying whether the first liberal translation text is to be output based on the acquired sentence suitability value, and the outputting the first liberal translation text may include: based on the sentence suitability value being greater than or equal to a second threshold value, outputting the first liberal translation text.

The control method may further include: identifying whether the second liberal translation text is to be output based on the second text and the second liberal translation text to obtain a second identification result; based on identifying that the first liberal translation text was output, and the second liberal translation text is to be output according to the second identification result, outputting a remaining part excluding the first liberal translation text in the second liberal translation text; and based on identifying that the first liberal translation text was not output, and the second liberal translation text is to be output, outputting the second liberal translation text.

The making the second identification may include: acquiring a sentence similarity value between the second translation text and the second liberal translation text; acquiring a sentence suitability value of the second liberal translation text; and identifying whether the second liberal translation text is to be output based on the sentence similarity value and the sentence suitability value, and the outputting the second liberal translation text may include: based on the sentence similarity value being greater than or equal to a third threshold value and the sentence suitability value being greater than or equal to a fourth threshold value, outputting the second liberal translation text.

According to the various embodiments of the disclosure as described above, time required from input of a text to output of a translation text corresponding to the input text can be reduced, and an effect that a user is provided with a real time translation service can be achieved.

Also, even if an input text is not in the form of a sentence, accuracy and reliability of a resulting product of real time translation can be improved.

BRIEF DESCRIPTION OF THE DRAWINGS

The above and other aspects, features, and advantages of embodiments of the disclosure will be more apparent from the following description taken in conjunction with the accompanying drawings, in which:

FIG. 2 is a table for illustrating first and second neural network models according to an embodiment of the disclosure;

FIG. 7 is a flow chart for illustrating a process related to a text, a translation text, and a liberal translation text according to an embodiment of the disclosure;

FIG. 8 is a diagram for illustrating an End of Phrase (EOP) according to an embodiment of the disclosure;

FIG. 9 is a flow chart for illustrating a process a third neural network model according to an embodiment of the disclosure;

DETAILED DESCRIPTION

Figure 1:
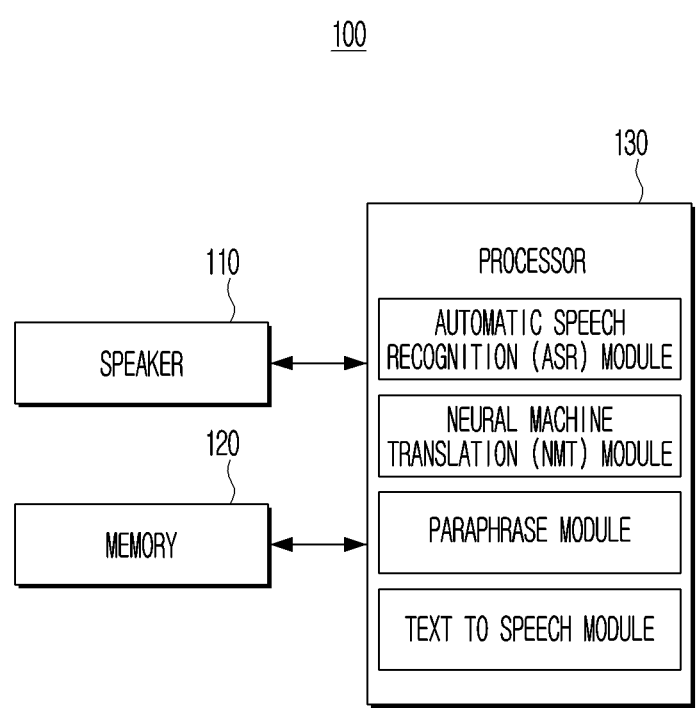
FIG. 1 is a block diagram illustrating a configuration of an electronic device according to an embodiment of the disclosure.

Hereinafter, embodiments of the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g., elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Also, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Singular expressions include plural expressions, unless defined differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the disclosure, "a module" or "a part" performs at least one function or operation, and it may be implemented as hardware or software, or as a combination of hardware and software. Further, a plurality of "modules" or "parts" may be integrated into at least one module and implemented as at least one processor, except "modules" or "parts" which need to be implemented as specific hardware.

In addition, in this specification, the term "user" may refer to a person who uses an electronic device or a device using an electronic device (e.g., an artificial intelligence electronic device).

Hereinafter, an embodiment of the disclosure will be described in more detail with reference to the accompanying drawings.

FIG. 1 is a block diagram illustrating a configuration of an electronic device according to an embodiment of the disclosure.

An electronic device 100 according to an embodiment of the disclosure may include, for example but not limited to, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a virtual reality (VR) implementation device, or a wearable device. Also, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or a bio-implantable circuit.

In some embodiments, the electronic device 100 may include, for example, at least one of a television, a digital video disk (DVD) player, an audio, a refrigerator, an air conditioner, a cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

In another embodiment, the electronic device 100 may include at least one of various types of medical instruments (e.g., various types of portable medical measurement instruments such as a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an ATM of a financial institution, a point of sales (POS) of a store, or an Internet of things (IoT) device (e.g., a light bulb, various types of sensors, a sprinkler device, a fire alarm, a thermostat, a street light, a toaster, exercise equipment, a hot water tank, a heater, a boiler, etc.).

In particular, the electronic device 100 according to an embodiment of the disclosure may be implemented as various types of devices that acquire a text corresponding to a user's input, translate the acquired text, and output the text. Here, a user's input may include the user's voice, a text input by the user, a signal received from an external device, etc.

Also, the electronic device 100 may translate an acquired text and output the text through a speaker 110. The speaker 110 according to an embodiment of the disclosure may output an audio signal. In this case, the speaker 110 may be implemented as at least one speaker unit. As an example, the speaker 110 may include a plurality of speaker units for reproducing multi channels. For example, the plurality of speaker units may respectively output different frequency bands.

While it is described in this embodiment that the electronic device 100 includes the speaker 110 so that the electronic device 100 translates a text corresponding to a user input, and outputs the text through the speaker 110 according to various embodiments of the disclosure. However, this is merely an example, and the disclosure is not limited thereto. For example, the electronic device 100 may output a translated text through a display.

The memory 120 may store data to be used in the various embodiments of the disclosure. The memory 120 may be implemented in the form of a memory embedded in the electronic device 100, or in the form of a memory that may be attached to or detached from the electronic device 100 according to the usage of stored data.

For example, data for operating the electronic device 100 may be stored in a memory embedded in the electronic device 100, and data for an extended function of the electronic device 100 may be stored in a memory that may be attached to or detached from the electronic device 100. In the case of a memory embedded in the electronic device 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). Also, in the case of a memory that may be attached to or detached from the electronic device 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), an external memory that may be connected to a USB port (e.g., a USB memory), etc.

According to an embodiment of the disclosure, the memory 120 may store a computer program including at least one instruction or instructions for controlling the electronic device 100.

According to another embodiment of the disclosure, the memory 120 may store information on an artificial intelligence model including a plurality of layers. Here, storing information on an artificial intelligence model may mean storing various information related to operations of an artificial intelligence model, e.g., information on a plurality of layers included in an artificial intelligence model, information on parameters used in the plurality of respective layers (e.g., a filter coefficient, a bias, etc.), and the like.

For example, the memory 120 may store a first neural network model trained to translate a text in a first language into a second language according to an embodiment of the disclosure. Also, the memory 120 may store a second neural network model trained to liberally translate a text. Detailed explanation regarding the first and second neural network models will be provided later.

A processor 130 according to an embodiment of the disclosure controls the overall operations of the electronic device 100.

According to an embodiment of the disclosure, the processor 130 may be implemented as for example, a digital signal processor (DSP) processing digital image signals, a microprocessor, an artificial intelligence (AI) processor, and a timing controller (T-CON). However, the disclosure is not limited thereto, and the processor 130 may include one or more of a central processing unit (CPU), a micro controller unit (MCU), a micro processing unit (VIPU), a controller, an application processor (AP), or a communication processor (CP), and an ARM processor, or may be defined by the corresponding term(s). Also, the processor 130 may be implemented as a system on chip (SoC) having a processing algorithm stored therein or large scale integration (LSI), or in the form of a field programmable gate array (FPGA).

In particular, the processor 130 may recognize a user voice and input a text corresponding to the user voice, or a text according to a user input into the first neural network model and acquire a translation text corresponding to the text. For example, an automatic speech recognition (ASR) module provided in the processor 130 may recognize a user voice received through an inputter (e.g., a microphone) and acquire a text corresponding to the user voice. Detailed explanation in this regard will be provide later.

The processor 130 according to an embodiment of the disclosure may input a text into the first neural network model and acquire a translation text. Here, the first neural network model may be a model trained to machine translate a text in the first language into the second language. The first neural network model may be a statistical machine translation (SMT) model, or a neural machine translation (NMT) model. Here, a neural machine translation model does not individually translate words, but performs translation in a unit of an entire sentence and a phrase, and accordingly, it exerts an effect of outputting a translation which is natural and in a high level of completion.

The processor 130 according to an embodiment of the disclosure may input a first text in the first language into the first neural network model and acquire a first translation text in the second language.

For example, if a Korean text corresponding to 'Athletes' is received as a first text, the processor 130 may input the Korean text corresponding to 'Athletes' into the first neural network model and acquire 'Athletes' as a first translation text corresponding to the first text. The aforementioned example assumes a case wherein the first neural network model receives a Korean text as an input and the input text translates from 'Korean' into 'English', but the disclosure is not limited thereto. For example, the processor 130 may acquire a translation text translated from 'English' into 'Korean' by using the first neural network model, and alternatively, the processor 130 may acquire translation texts translated into various languages. For example, the processor 130 may acquire a text translated from 'Spanish' into 'English' by using the first neural network model.

Then, the processor 130 may input the first translation text into the second neural network model and acquire a first liberal translation text corresponding to the first translation text.

Here, a liberal translation text output by the second neural network model may mean a text of which meaning is identical or similar to the meaning of the translation text, but includes words different from the words included in the translation text, or a text wherein the sentence components (e.g., the subject, the object, the predicate, etc.) included in the translation text are arranged differently. For example, if the first translation text is 'Athletes,' the second neural network model may output any one of 'sportsperson' or 'player' as the first liberal translation text corresponding to the first translation text. However, this is merely an example, and the disclosure is not limited thereto. For example, the first liberal translation text output by the second neural network model may be identical to the first translation text. As an example, the second neural network model may output 'Athletes' as the first liberal translation text corresponding to the first translation text 'Athletes.'

Then, the processor 130 may identify whether the first liberal translation text may be output based on the first translation text and the first liberal translation text.

For example, the processor 130 may acquire a sentence similarity value between the first translation text 'Athletes' and the first liberal translation text 'Athletes,' and if the acquired sentence similarity value is greater than or equal to a first threshold value, the processor 130 may output the first liberal translation text. A sentence similarity value according to an embodiment of the disclosure is a value that digitized how similar the meanings are between the first text in the first language and the first liberal translation text in the second language, and it may be expressed as a value of 0 to 1. As the sentence similarity value is closer to 1, it may mean that the meaning of the first text in the first language and the meaning of the first liberal translation text in the second language are identical or similar. Meanwhile, the first threshold value may be 0.5, but this is merely an example, and the disclosure is not limited thereto.

If a sentence similarity value is greater than or equal to the first threshold value, the processor 130 according to an embodiment of the disclosure may identify that the first liberal translation text may be output. In this case, the processor 130 may control the speaker 110 to output the first liberal translation text. For example, the processor 130 may convert the first liberal translation text into a voice by using a text to speech (TTS) model, and output the converted voice through the speaker 110.

The processor 130 according to an embodiment of the disclosure may acquire a sentence suitability value of the first liberal translation text, and if the acquired sentence suitability value is greater than or equal to a second threshold value, the processor 130 may output the first liberal translation text. In the aforementioned embodiment, description was made based on the assumption of a case wherein a liberal translation text is one word, for example, 'Athletes,' but according to the various embodiments of the disclosure, a liberal translation text may be a text in the form of a sentence including a plurality of words.

If a liberal translation text in the form of a sentence including a plurality of words (i.e., not including only one word) is ungrammatical (asyntactic), the processor 130 may identify that the liberal translation text cannot be output.

The processor 130 according to an embodiment of the disclosure may digitize sentence suitability of a liberal translation text, e.g., whether a liberal translation text follows grammar, whether there are sentence components (e.g., a subject, a verb, an object, etc.), and the like, and acquire a sentence suitability value. As an example, a sentence suitability value may be expressed as a value of 0 to 1, and as the value is closer to 1, it may mean that sentence suitability of a liberal translation text is high. That is, as a sentence suitability value is closer to 1, it may mean that a liberal translation text follows grammar, and is in the form of a completed sentence.

Then, if a sentence suitability value of a liberal translation text is greater than or equal to the second threshold value, the processor 130 may identify that the liberal translation text may be output. Meanwhile, the second threshold value may be 0.5, but the disclosure is not limited thereto.

The processor 130 according to an embodiment of the disclosure may identify that a liberal translation text may be output limited to a case wherein both of i) a sentence similarity value between a text in a first language and a liberal translation text in a second language and ii) a sentence suitability value of a liberal translation text in a second language are greater than or equal to corresponding threshold values. Also, in another embodiment, the processor 130 may identify that a liberal translation text may be output in a case where any one of the sentence similarity value and the sentence suitability value is greater than or equal to the corresponding threshold value.

The various embodiments of the disclosure provides an interpretation service (or an interpretation program) of translating a user voice (or a text) input in real time and outputting the translation, while reducing time from the time point of input of a user voice to the time point of output of the translated voice such that the user may feel as if the voice or text is translated in real time.

Hereinafter, various embodiments wherein a second text received subsequently to the aforementioned first text is translated and is then output will be described. Explanation in this regard will be made with reference to FIG. 2.

FIG. 2 is a table for illustrating a first neural network model 1 and a second neural network model 2 according to an embodiment of the disclosure.

The processor 130 according to an embodiment of the disclosure may input a second text received subsequently to the first text into the first neural network model 1 and acquire a second translation text corresponding to the first and second texts.

According to an embodiment of the disclosure, the first neural network model 1 may be a sequence-to-sequence model. Here, a sequence means continuous data that is interrelated, and a text of a predetermined unit (e.g., a morpheme, a word, etc.) such as the first text and the second text in the disclosure may be regarded as an example of a sequence.

When the first text and the second text are input, the first neural network model 1 according to an embodiment of the disclosure may output a translation text (i.e., a second translation text) in consideration of both of the first text and the second text. As described above, the first neural network model 1 is not a conventional statistical machine translation (SMT) model, but a neural machine translation (NMT) model based on an artificial neural network, and an NMT model may perform machine translation by recognizing the entire first and second texts as one translation unit, instead of individually translating each of the first text and the second text.

<Step 1 & Step 2>

Referring to FIG. 2, for illustrative purposes, it is assumed a first text which is a Korean text corresponding to 'Athletes' is input (Step 1), and then a second text which is a Korean text corresponding to 'At London Olympic' is input (Step 2).

Step 1—It is described above that the processor 130 according to an embodiment of the disclosure acquires a first liberal translation text 'Athletes' corresponding to the first text, which is a Korean text corresponding to 'Athletes.'

Step 2—The processor 130 may input the second text which is a Korean text corresponding to 'At London Olympic' received subsequently to the first text into the first neural network model 1. Here, the first neural network model 1 may output a second translation text corresponding to the first and second texts in consideration of both of the first text which is a Korean text corresponding to 'Athletes' and the second text which is a Korean text corresponding to 'At London Olympic.'

Referring to FIG. 2, the processor 130 may acquire the second translation text 'At London Olympic, athletes', corresponding to the first and second texts.

The processor 130 according to an embodiment of the disclosure may input whether the first liberal translation text acquired in Step 1 is output (or an identification result regarding whether the first liberal translation text may be output) and the second translation text 'At London Olympic, athletes' into the second neural network model 2, and acquire a second liberal translation text corresponding to the second translation text.

For example, it is assumed that the sentence similarity value between the first text which is a Korean text corresponding to 'Athletes' and the first liberal translation text 'Athletes' in Step 1 is 0.7, and thus the sentence similarity value is greater than or equal to the first threshold value, and the sentence suitability value of the first liberal translation text 'Athletes' is 0.9, and thus the sentence suitability value is greater than or equal to the second threshold value. Accordingly, the processor 130 identifies that the first liberal translation text 'Athletes' may be output, and outputs the first liberal translation text 'Athletes'. In this state, the second text which is a Korean text corresponding to 'At London Olympic' is received.

In this case, if it is identified that the first liberal translation text was output according to the identification result (i.e., whether the first liberal translation text may be output), the second neural network model 2 may output a second liberal translation text 'Athletes At London Olympic' including the first liberal translation text 'Athletes,' and corresponding to the second translation text 'At London Olympic, athletes' so that the first liberal translation text 'Athletes' is located in the front in the word order.

As another example, unlike what is illustrated in FIG. 2, it may be assumed that at least one of the sentence similarity value or the sentence suitability value of the first liberal translation text in Step 1 is smaller than the threshold value, and thus it is identified that the first liberal translation text cannot be output. Accordingly, the processor 130 does not output the first liberal translation text, and in this state, the second text is received.

In this case, if it is identified that the first liberal translation text was not output according to the identification result, the second liberal translation text does not necessarily have to include the first liberal translation text 'Athletes,' or the first liberal translation text 'Athletes' does not have to be located in the front in the word order, and thus the second neural network model 2 may output 'At London Olympic, athletes' which is identical to the second translation text 'At London Olympic, athletes' as the second liberal translation text.

For example, as in Step 1 in FIG. 2, it may be assumed that the processor 130 outputs the first translation text 'Athletes' which is acquired prior to acquiring the second translation text 'At London Olympic, athletes' for providing a real time translation (or interpretation) service.

Then, as in Step 2 in FIG. 2, the second text which is a Korean text corresponding to 'At London Olympic' is received, and accordingly, the processor 130 acquires the second translation text 'At London Olympic, athletes' by inputting the first text which is a Korean text corresponding to 'Athletes' and the second text which is a Korean text corresponding to 'At London Olympic' into the first neural network model 1, and outputs the second translation text 'At London Olympic, athletes.' In this case, from the viewpoint of the user, the user is made to sequentially hear 'Athletes' (which is output in Step 1) and 'At London Olympic, athletes' (which is output in Step 2), and because the user hears some expressions (or some phrases) redundantly, there is a problem that reliability of translation deteriorates.

As another example, if the processor 130 translates a user voice and outputs the translation after receiving a sufficient length of the user voice (e.g., after receiving the user voice corresponding to one complete sentence), for providing a translation that is natural and semantically correct, there is a problem that a long period of time is spent from the time point of input of the user voice to the time point of output of the translated voice (i.e., the latency time increases).

Accordingly, to resolve the aforementioned problems, the processor 130 according to the various embodiments of the disclosure may translate (or liberally translate) a received text, and then, if it is identified that a translation text (or a liberal translation text) may be output, the processor 130 may output the text first through the speaker 110.

Then, in translating (or liberally translating) a newly received text, the processor 130 does not simply translate the newly received text and output the translation of the newly received text, but if there is a translation text (or a liberal translation text) that was previously output, the processor 130 liberally translates the newly received text in consideration of the previously output translation text, and then outputs the liberal translation.

In detail, with reference to FIG. 2, the second neural network model 2 may output a second liberal translation text corresponding to the second translation text 'At London Olympic, athletes' in consideration of the identification result regarding whether the first liberal translation text 'Athletes' may be output.

For example, if it is identified that the first liberal translation text 'Athletes' was output, the second neural network model 2 may output the second liberal translation text 'Athletes at London Olympic' which was liberally translated to satisfy Condition 1) 'the first liberal translation text 'Athletes' is located in the very front in the word order,' and Condition 2) 'to be semantically similar to the second translation text 'At London Olympic, athletes.''

Then, the processor 130 may identify whether the second liberal translation text may be output based on the second translation text and the second liberal translation text.

According to an embodiment of the disclosure, the processor 130 may acquire a sentence similarity value between the second translation text 'At London Olympic, athletes' and the second liberal translation text 'Athletes at London Olympic.'

Also, the processor 130 may acquire a sentence suitability value of the second liberal translation text 'Athletes at London Olympic.'

Then, if the sentence similarity value between the second translation text and the second liberal translation text is greater than or equal to the first threshold value, and/or the sentence suitability value of the second liberal translation text is greater than or equal to the second threshold value, the processor 130 may identify that the second liberal translation text may be output, and control the speaker 110 to output the second liberal translation text.

If it is identified that the first liberal translation text was output, and the second liberal translation text may be output, the processor 130 may control the speaker 110 to output the remaining part excluding the first liberal translation text in the second liberal translation text.

For example, referring to FIG. 2, if it is identified that the first liberal translation text 'Athletes' was output in Step 1, and it is identified that the second liberal translation text 'Athletes at London Olympic' may be output, the processor 130 may control the speaker 110 to output the remaining part 'at London Olympic' excluding the first liberal translation text 'Athletes' in the second liberal translation text 'Athletes at London Olympic.'

According to the aforementioned method, the following effects may be achieved. The processor 130 may not need to wait until the entire Korean text corresponding to 'Athletes at London Olympic' is input, and the processor 130 may output 'Athletes' even when only the Korean text corresponding to 'Athletes' was received, and thus the latency time may be reduced. Also, in a case where the Korean text corresponding to 'at London Olympic' is received sequentially after the Korean text corresponding to 'Athletes,' the processor 130 may output 'at London Olympic' through the speaker 110. From the viewpoint of the user, the user is provided with 'Athletes' and 'at London Olympic' sequentially, and thus the user may feel as if the user is provided with a real time translation service (or an interpretation service).

Here, the second neural network model 2 is a model that is trained to, if the first translation text and the second translation text are input sequentially, output a second liberal translation text which is semantically similar to the second translation text while the first liberal translation text corresponding to the first translation text input first is maintained or fixed. The second neural network model 2 may be implemented as a recurrent neural network (RNN) a Restricted Boltzmann Machine (RBM), a deep belief network (DBN), a bidirectional recurrent deep neural network (BRDNN), a convolutional neural network (CNN), or deep Q-networks, etc., but is not limited thereto.

The following describes in detail the method for the second neural network model 2 to liberally translate the second translation text while the first liberal translation text corresponding to the first translation text input first is maintained or fixed.

Referring to Step 1 illustrated in FIG. 2, the processor 130 may output, or may not output the first liberal translation text based on whether the first liberal translation text acquired through the second neural network model 2 may be output.

As an example, the processor 130 may input the first translation text and the first liberal translation text corresponding to the first translation text into a neural network model trained to output a sentence similarity value between a translation text and a liberal translation text, and acquire a sentence similarity value between the first translation text and the first liberal translation text.

If the sentence similarity value is greater than or equal to the first threshold value, the processor 130 may output the first liberal translation text acquired through the second neural network model 2.

For example, referring to Step 4 in FIG. 2, the processor 130 may acquire a sentence similarity value between the first translation text 'If athletes take drug at London Olympic,' and the first liberal translation text 'Athletes at London Olympic who take drug will,' and if the sentence similarity value is greater than or equal to the first threshold value 0.5, the processor 130 may output the first liberal translation text 'Athletes at London Olympic who take drug will.'

Referring to Step 5 in FIG. 2, the processor 130 according to an embodiment of the disclosure may input whether the first liberal translation text 'Athletes at London Olympic who take drug will' was output (or an identification result regarding whether the first liberal translation text may be output) and the second translation text 'If athletes take drug at London Olympic, being caught' based on a Korean text corresponding to 'If athletes take drug at London Olympic, being caught' including a newly received Korean text corresponding to 'being caught' into the second neural network model 2.

Then, the second neural network model 2 may output a second liberal translation text corresponding to the second translation text 'If athletes take drug at London Olympic, being caught', wherein the second liberal translation text satisfies the following two conditions. First, the second liberal translation text may include the first liberal translation text 'Athletes at London Olympic who take drug will.'

Second, the first liberal translation text 'Athletes at London Olympic who take drug will' may be located in the very front in the word order within the second liberal translation text.

Accordingly, the second neural network model 2 may output the second liberal translation text 'Athletes at London Olympic who take drug being caught' corresponding to the second translation text 'If athletes take drug at London Olympic, being caught.'

Then, the processor 130 may identify whether the second liberal translation text 'Athletes at London Olympic who take drug being caught' may be output.

In Steps 4 and 5 in FIG. 2, only an embodiment wherein it is considered whether a sentence similarity value between a translation text and a liberal translation text is greater than or equal to the first threshold value regarding whether a liberal translation text may be output is described. However, this is merely an example, and in another embodiment, it may be identified whether a liberal translation text may be output in consideration of a sentence suitability value as well as a sentence similarity value.

Referring to Step 5 in FIG. 2, the processor 130 may acquire a sentence suitability value of the second liberal translation text 'Athletes at London Olympic who take drug being caught.' For example, the processor 130 may acquire a sentence suitability value by inputting a liberal translation text into a neural network model trained to output a sentence suitability value.

According to an embodiment of the disclosure, if the sentence suitability value of the second liberal translation text 'Athletes at London Olympic who take drug being caught' is smaller than the second threshold value, the processor 130 may identify that the second liberal translation text 'Athletes at London Olympic who take drug being caught' cannot be output, even if the sentence similarity value between the second translation text 'If athletes take drug at London Olympic, being caught' and the second liberal translation text 'Athletes at London Olympic who take drug being caught' is greater than or equal to the first threshold value.

Then, referring to Step 6 in FIG. 2, the processor 130 may input a third translation text 'If athletes take drug at London Olympic, they are likely to be caught' based on a Korean text corresponding to 'If athletes take drug at London Olympic, they are likely to be caught' including a newly received text 'likely to' into the second neural network model 2.

Then, the second neural network model 2 may output a third liberal translation text 'Athletes at London Olympic who take drug will be caught' corresponding to the third translation text 'If athletes take drug at London Olympic, they are likely to be caught.'

Here, the third liberal translation text 'Athletes at London Olympic who take drug will be caught' output by the second neural network model 2 satisfies the following two conditions.

First, in Step 5, the processor 130 identifies that the second liberal translation text 'Athletes at London Olympic who take drug being caught' output by the second neural network model 2 cannot be output, and thus the third liberal translation text output by the second neural network model 2 in Step 6 includes 'Athletes at London Olympic who take drug will' output through the speaker 110 in the prior steps of Step 5, i.e., Step 1 to Step 4.

Second, in Step 6, the second neural network model 2 may output the third liberal translation text wherein 'Athletes at London Olympic who take drug will' output through the speaker 110 in Step 1 to Step 4 is located in the very front in the word order.

That is, if it was identified that a liberal translation text acquired through the second neural network model 2 in the prior step (e.g., Step N−1) of the current Step (e.g., Step N) cannot be output, the second neural network model 2 may output a liberal translation text wherein, not a liberal translation text acquired in the prior step (e.g., Step N−1), but a liberal translation text identified as being able to be output in the prior step thereof (e.g., Step N−2) is located in the very front in the word order, and which corresponds to the translation text of the current step (e.g., Step N).

In the third liberal translation text 'Athletes at London Olympic who take drug will be caught,' the processor 130 may sequentially output only the remaining text 'be caught' excluding 'Athletes at London Olympic who take drug will' that was output through the speaker 110 in Step 1 to Step 4.

Referring to FIG. 2, the processor 130 may sequentially output 'Athletes' in Step 1, 'at London Olympic' in Step 2, 'who take drug will' in Step 4, and 'be caught' in Step 6 before the entire Korean text corresponding to 'If athletes take drug at London Olympic, they are likely to be caught' is received, and from the viewpoint of the user, there may be an effect that the user is provided with a text translated as if in real time (or substantially real time).

FIG. 3 to FIG. 7 are flow charts for illustrating a process related to a text, a translation text, and a liberal translation text according to embodiments of the disclosure.

Referring to FIG. 3 to FIG. 7, a process related to a text, a translation text, and a liberal translation text will be explained through embodiment.

Figure 3:
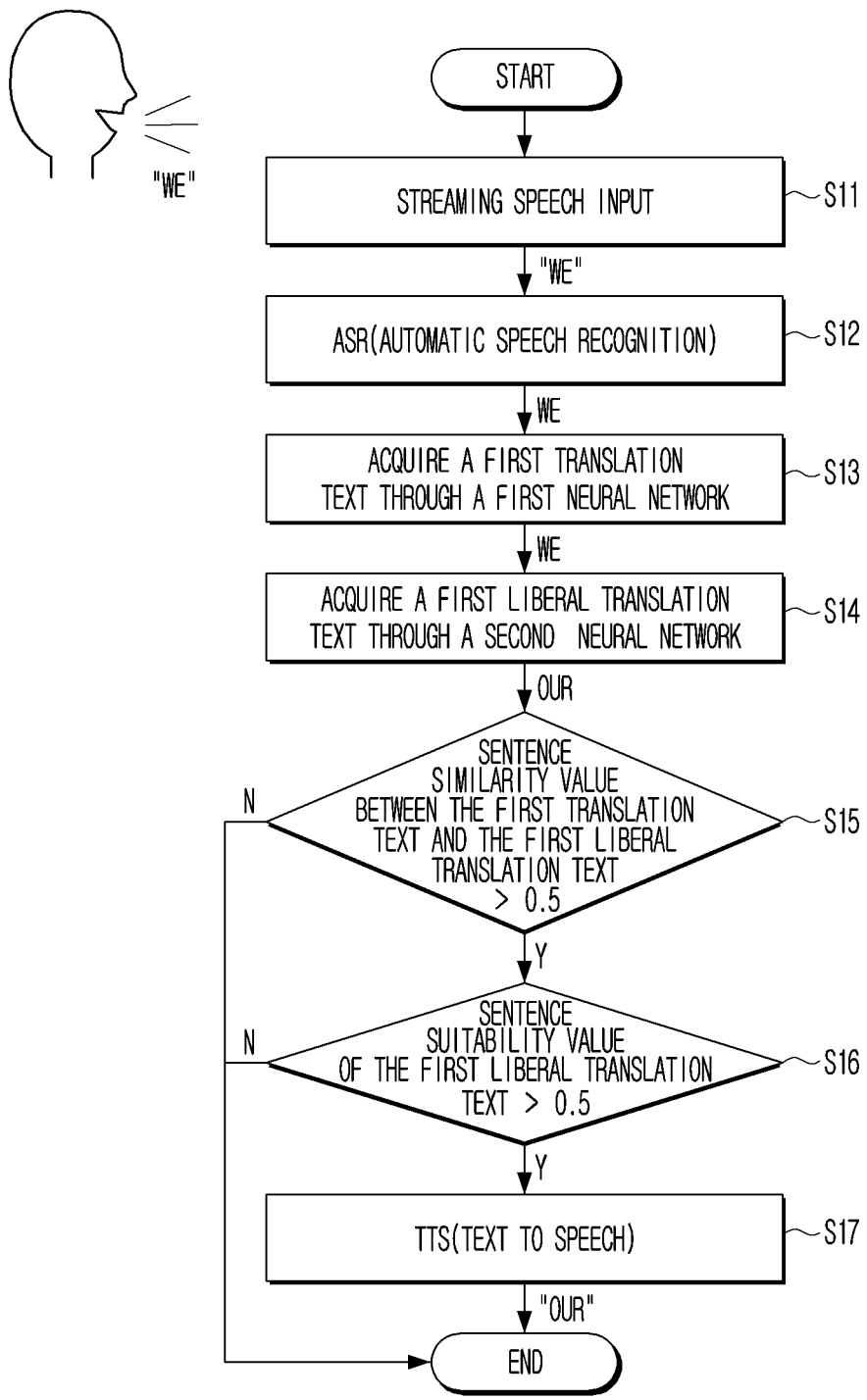
FIG. 3 is a flow chart for illustrating a process related to a text, a translation text, and a liberal translation text according to an embodiment of the disclosure.

First, FIG. 3 corresponds to Step 1 in FIG. 2, and it is assumed that the first word among a plurality of words constituting a sentence is received.

A case wherein the user utters a word corresponding to 'We' in the first language (that is not English) may be assumed. In this case, when the user voice, i.e., corresponding to 'We' is received through the microphone in operation S11, the processor 130 may perform voice recognition and acquire a first text in the first language corresponding to 'We' in operation S12. For example, the processor 130 may acquire a text corresponding to the user voice by using an automatic speech recognition model, a speech-to-text (STT) model, etc.

Then, the processor 130 may identify a first translation text 'We' in the second language (e.g., English) corresponding to the first text through the first neural network model 1 in operation S13.

Then, the processor 130 may input the first translation text 'We' into the second neural network model 2 and acquire a first liberal translation text 'Our' in operation S14.

The processor 130 according to an embodiment of the disclosure may identify whether the first liberal translation text 'Our' may be output, and specifically, the processor 130 may acquire a sentence similarity value and a sentence suitability value corresponding to the first liberal translation text 'Our.'

First, referring to FIG. 3, the processor 130 may identify a sentence similarity value between the first translation text 'We' and the first liberal translation text 'Our,' and if the sentence similarity value is greater than or equal to the first threshold value (e.g., 0.5) in operation S15:Y, the processor 130 may identify the sentence suitability value of the first liberal translation text 'Our' in operation S16.

In operation S16, if the sentence suitability value of the first liberal translation text 'Our' is greater than or equal to the second threshold value (e.g., 0.5) (S16:Y), the processor 130 may determine that the first liberal translation text 'Our' may be output and convert the first liberal translation text 'Our' into a sound signal through a TTS model, and output the signal through the speaker 110.

As another example, if the sentence similarity value is smaller than the first threshold value in operation S15 (S15:N), or the sentence suitability value is smaller than the second threshold value in operation S16 (S16:N), the processor 130 may determine that the first liberal translation text 'Our' cannot be output, and end the corresponding step, i.e., Step 1.

Hereinafter, for the convenience of explanation, explanation will be made based on the assumption that at least one of a sentence similarity value or a sentence suitability value corresponding to the first liberal translation text is identified to be smaller than the threshold value, and it is determined that the first liberal translation text cannot be output.

Figure 4:
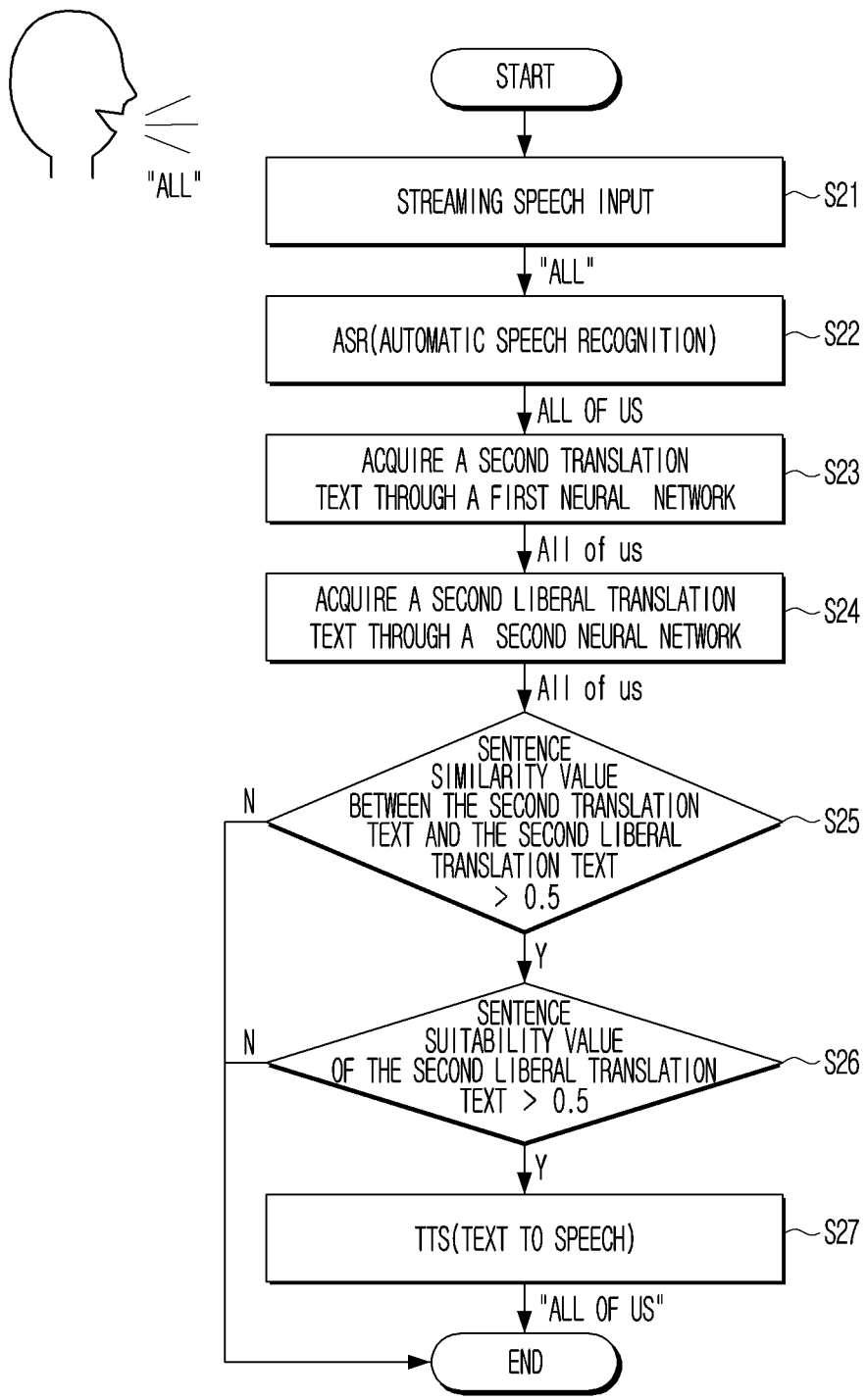
FIG. 4 is a flow chart for illustrating a process related to a text, a translation text, and a liberal translation text according to an embodiment of the disclosure.

Next, FIG. 4 corresponds to Step 2 in FIG. 2, and it is assumed that the second word among a plurality of words constituting a sentence is received.

A case wherein the user uttered a word in the first language corresponding to 'All' may be assumed. In this case, when the user voice, i.e., corresponding to 'All' is received through the microphone in operation S21, the processor 130 may perform voice recognition and acquire a second text in the first language corresponding to 'All' in operation S22.

Then, the processor 130 may input the first text in the first language corresponding to 'We' and the second text in the first language corresponding to 'All' into the first neural network model 1 and acquire a second translation text in the second language (e.g., English) 'All of us' in operation S23.

Then, the processor 130 may input the second translation text 'All of us' into the second neural network model 2 and acquire a second liberal translation text 'All of us' in operation S24. Meanwhile, it is described above that a translation text and a liberal translation text corresponding to the translation text may be identical.

In operation S24, the second neural network model 2 may output a second liberal translation text corresponding to the second translation text 'All of us' in consideration of whether the first liberal translation text was output (or whether it may be output) as well as the second translation text 'All of us.'

For example, in Step 1 illustrated in FIG. 3, if it was determined that the first liberal translation text 'Our' may be output and the text was output through the speaker 110, in operation S24, the second neural network model 2 may output a second liberal translation text wherein the first liberal translation text 'Our' is located in the very front in the word order, and which is semantically similar to the second translation text 'All of us.' However, as described above, a case wherein it is determined that the first liberal translation text 'Our' cannot be output in Step 1 illustrated in FIG. 3 may be assumed, and in operation S24, the second neural network model 2 may output the second liberal translation text 'All of us.'

Then, the processor 130 may identify a sentence similarity value between the second translation text 'All of us' and the second liberal translation text 'All of us,' and if the sentence similarity value is greater than or equal to the first threshold value (e.g., 0.5) in operation S25:Y, the processor 130 may identify the sentence suitability value of the second liberal translation text 'All of us' in operation S26.

In operation S26, if the sentence suitability value of the second liberal translation text 'All of us' is greater than or equal to the second threshold value (e.g., 0.5) (S26:Y), the processor 130 may determine that the second liberal translation text 'All of us' may be output and convert the second liberal translation text 'All of us' into a sound signal through a TTS model, and output the signal through the speaker 110 in operation S27.

Hereinafter, for the convenience of explanation, explanation will be made based on the assumption of a case wherein a sentence similarity value and a sentence suitability value corresponding to the second liberal translation text are respectively identified to be greater than or equal to the threshold value, and based on this, it is determined that the second liberal translation text may be output. However, this is merely an example and the disclosure is not limited thereto.

Figure 5:
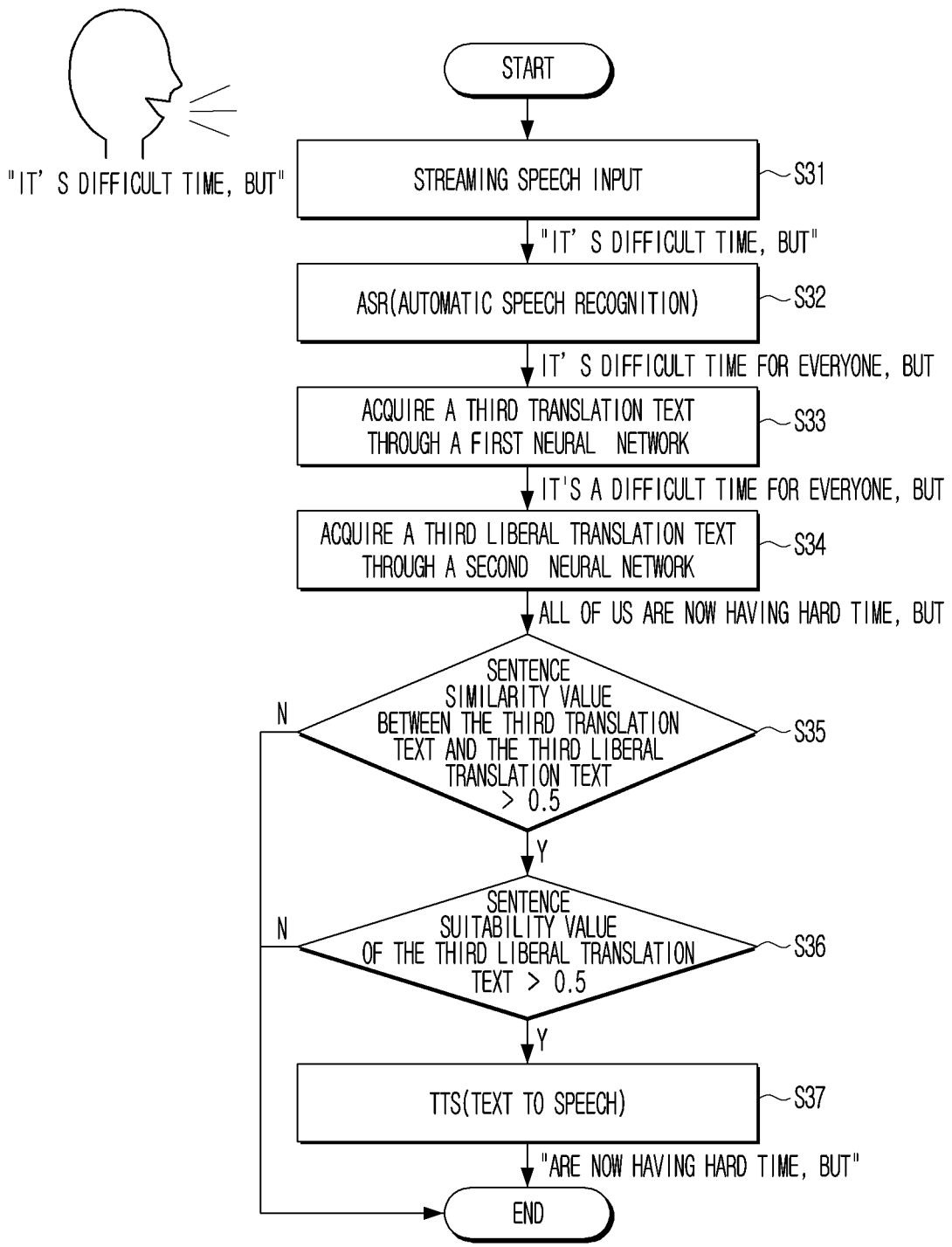
FIG. 5 is a flow chart for illustrating a process related to a text, a translation text, and a liberal translation text according to an embodiment of the disclosure.

Next, FIG. 5 is Step 3 in FIG. 2, and it is assumed that a third word among a plurality of words constituting a sentence is received.

A case wherein the user uttered a phrase corresponding to 'It's difficult time, but' in the first language may be assumed. In this case, when the user voice, i.e., corresponding to 'It's difficult time, but' is received through the microphone in operation S31, the processor 130 may perform voice recognition and acquire a third text 'It's difficult time, but' in operation S32.

Then, the processor 130 may input the first text 'We,' the second text 'All,' and the third text 'It's difficult time, but' into the first neural network model 1, and acquire a third translation text 'It's difficult time for everyone, but' in operation S33.

Then, the processor 130 may input the third translation text 'It's difficult time for everyone, but' into the second neural network model 2 and acquire a third liberal translation text 'All of us are now having hard time, but' in operation S34.

In operation S34, the second neural network model 2 may output a third liberal translation text corresponding to the third translation text 'It's difficult time for everyone, but' in consideration of whether the second liberal translation text was output (or whether it may be output) as well as the third translation text 'It's difficult time for everyone, but.'

For example, in Step 2 illustrated in FIG. 4, if it was determined that the second liberal translation text 'All of us' may be output and the text was output through the speaker 110, in operation S34, the second neural network model 2 may output a third liberal translation text 'All of us are now having hard time, but' wherein the second liberal translation text 'All of us' is located in the very front in the word order, and which is semantically similar to the third translation text 'It's difficult time for everyone, but.'

Then, the processor 130 may identify a sentence similarity value between the third translation text 'It's difficult time for everyone, but' and the third liberal translation text 'All of us are now having hard time, but,' and if the sentence similarity value is greater than or equal to the first threshold value (e.g., 0.5) in operation S35:Y, the processor 130 may identify the sentence suitability value of the third liberal translation text 'All of us are now having hard time, but' in operation S36.

In operation S36, if the sentence suitability value of the third liberal translation text 'All of us are now having hard time, but' is greater than or equal to the second threshold value (e.g., 0.5) (S36:Y), the processor 130 may determine that the third liberal translation text 'All of us are now having hard time, but' may be output and convert the third liberal translation text 'All of us are now having hard time, but' into a sound signal through a TTS model, and output the signal through the speaker 110 in operation S37.

Meanwhile, in operation S37, only the part 'are now having hard time, but' excluding 'All of us' that was previously output through the speaker 110 in operation S27 may be converted into a sound signal, and then output through the speaker 110.

As another example, if it was determined that the first liberal translation text 'Our' cannot be output in Step 1 illustrated in FIG. 3, and it was determined that the second liberal translation text 'All of us' cannot be output in Step 2 illustrated in FIG. 4, the second neural network model 2 may output 'It's difficult time for everyone, but' as the third liberal translation text corresponding to the third translation text in operation S34.

Figure 6:
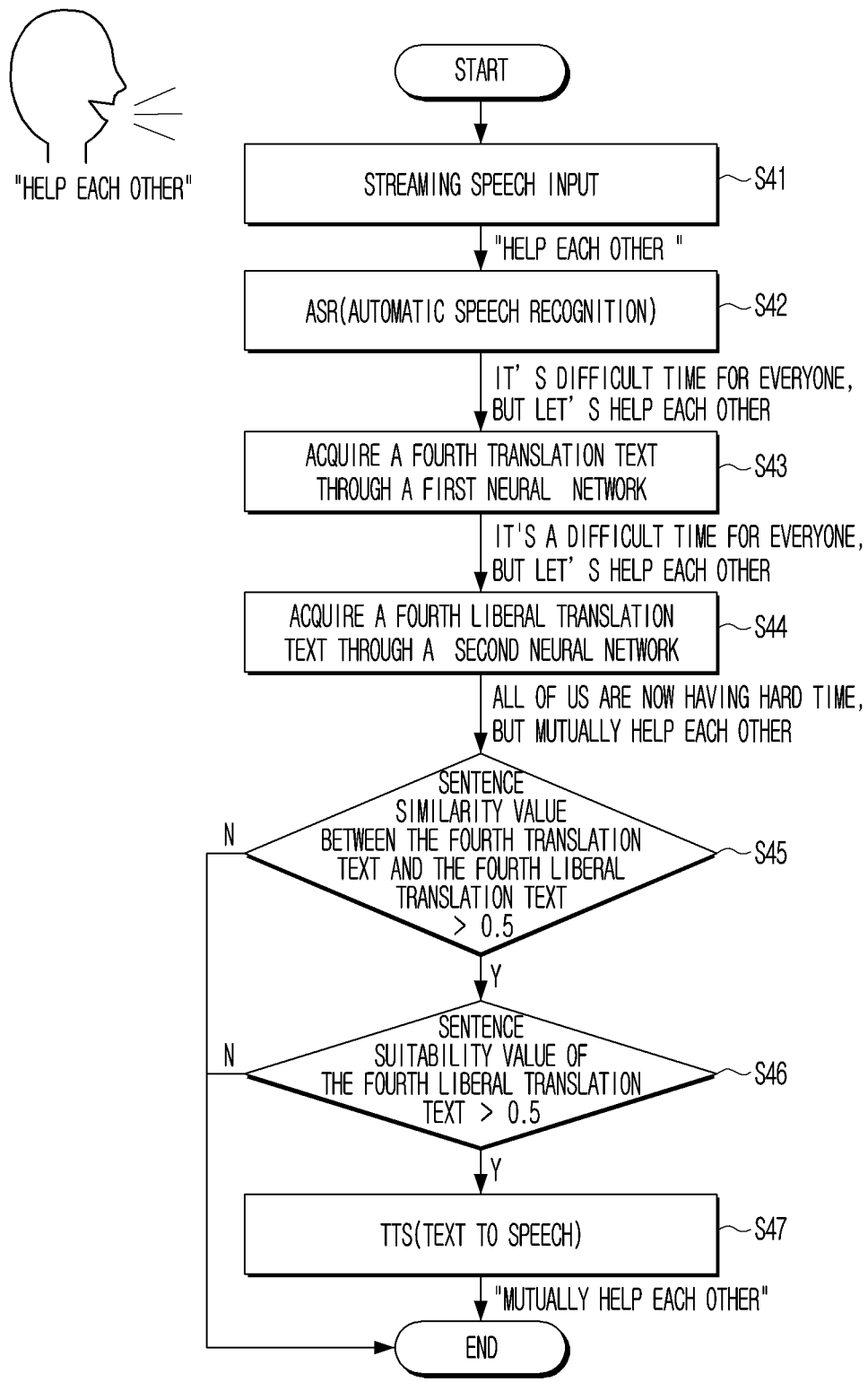
FIG. 6 is a flow chart for illustrating a process related to a text, a translation text, and a liberal translation text according to an embodiment of the disclosure.

Next, FIG. 6 corresponds to Step 4 in FIG. 2, and it is assumed that a fourth word among a plurality of words constituting a sentence is received.

A case wherein the user uttered a phrase corresponding to 'help each other' in the first language may be assumed. In this case, when the user voice, i.e., corresponding to 'help each other' is received through the microphone in operation S41, the processor 130 may perform voice recognition and acquire a fourth text 'help each other' in operation S42.

Then, the processor 130 may input the first text corresponding to 'We,' the second text corresponding to 'All,' the third text corresponding to 'It's difficult time, but,' and the fourth text corresponding to 'help each other' into the first neural network model 1, and acquire a fourth translation text 'It's difficult time for everyone, but let's help each other' in operation S43.

Then, the processor 130 may input the fourth translation text 'It's difficult time for everyone, but let's help each other' into the second neural network model 2 and acquire a fourth liberal translation text 'All of us are now having hard time, but mutually help each other' in operation S44.

In operation S44, the second neural network model 2 may output a fourth liberal translation text corresponding to the fourth translation text 'It's difficult time for everyone, but let's help each other' in consideration of whether the third liberal translation text was output (or whether it may be output) as well as the fourth translation text 'It's difficult time for everyone, but let's help each other.'

For example, in Step 3 illustrated in FIG. 5, if it was determined that the third liberal translation text 'All of us are now having hard time, but' may be output and the text was output through the speaker 110, in operation S44, the second neural network model 2 may output a fourth liberal translation text 'All of us are now having hard time, but mutually help each other' wherein the third liberal translation text 'All of us are now having hard time, but' is located in the very front in the word order, and which is semantically similar to the fourth translation text 'It's difficult time for everyone, but let's help each other.'

Then, the processor 130 may identify a sentence similarity value between the fourth translation text 'It's difficult time for everyone, but let's help each other' and the fourth liberal translation text 'All of us are now having hard time, but mutually help each other,' and if the sentence similarity value is greater than or equal to the first threshold value (e.g., 0.5) in operation S45:Y, the processor 130 may identify the sentence suitability value of the fourth liberal translation text 'All of us are now having hard time, but mutually help each other' in operation S46.

In operation S46, if the sentence suitability value of the fourth liberal translation text 'All of us are now having hard time, but mutually help each other' is greater than or equal to the second threshold value (e.g., 0.5) (S46:Y), the processor 130 may determine that the fourth liberal translation text 'All of us are now having hard time, but mutually help each other' may be output and convert the fourth liberal translation text 'All of us are now having hard time, but mutually help each other' into a sound signal through a TTS model, and output the signal through the speaker 110 in operation S47.

Meanwhile, in operation S47, only the part 'mutually help each other' excluding 'All of us' and 'are now having hard time, but' that were previously output through the speaker 110 in operation S27 and operation S37 may be converted into sound signals, and then output through the speaker 110.

As another example, if it was determined that the sentence similarity value is smaller than the first threshold value in operation S45 (S45:N), or the sentence suitability value is smaller than the second threshold value in operation 46 (S46:N), the processor 130 may determine that the fourth liberal translation text 'All of us are now having hard time, but mutually help each other' cannot be output, and end the corresponding step, i.e., Step 4.

Next, FIG. 7 corresponds to Step 5 in FIG. 2, and it is assumed that the last word among a plurality of words constituting a sentence is received.

A case wherein the user uttered a phrase corresponding to 'encourage each other' in the first language may be assumed. In this case, when the user voice, i.e., corresponding to 'encourage each other' is received through the microphone in operation S51, the processor 130 may perform voice recognition and acquire a fifth text 'encourage each other' in operation S52.

Then, the processor 130 may input the first text corresponding to 'We,' the second text corresponding to 'All,' the third text corresponding to 'It's difficult time, but,' the fourth text corresponding to 'help each other,' and the fifth text corresponding to 'encourage each other' into the first neural network model 1, and acquire a fifth translation text 'It's difficult time for everyone, but let's help and encourage each other' in operation S53.

Then, the processor 130 may input the fifth translation text 'It's difficult time for everyone, but let's help and encourage each other' into the second neural network model 2 and acquire a fifth liberal translation text 'All of us are now having hard time, but mutually help each other and support' in operation S54.

In operation S54, the second neural network model 2 may output a fifth liberal translation text corresponding to the fifth translation text 'It's difficult time for everyone, but let's help and encourage each other' in consideration of whether the fourth liberal translation text was output (or whether it may be output) as well as the fifth translation text 'It's difficult time for everyone, but let's help and encourage each other.'

For example, in Step 4 illustrated in FIG. 6, if it was determined that the fourth liberal translation text 'All of us are now having hard time, but mutually help each other' may be output and the text was output through the speaker 110, in operation S54, the second neural network model 2 may output a fifth liberal translation text 'All of us are now having hard time, but mutually help each other and support' wherein the fourth liberal translation text 'All of us are now having hard time, but mutually help each other' is located in the very front in the word order, and which is semantically similar to the fifth translation text 'It's difficult time for everyone, but let's help and encourage each other.'

Then, the processor 130 may identify a sentence similarity value between the fifth translation text 'It's difficult time for everyone, but let's help and encourage each other' and the fifth liberal translation text 'All of us are now having hard time, but mutually help each other and support,' and if the sentence similarity value is greater than or equal to the first threshold value (e.g., 0.5) in operation S55:Y, the processor 130 may identify the sentence suitability value of the fifth liberal translation text 'All of us are now having hard time, but mutually help each other and support' in operation S56.

In operation S56, if the sentence suitability value of the fifth liberal translation text 'All of us are now having hard time, but mutually help each other and support' is greater than or equal to the second threshold value (e.g., 0.5) (S56:Y), the processor 130 may determine that the fifth liberal translation text 'All of us are now having hard time, but mutually help each other and support' may be output and convert the fifth liberal translation text 'All of us are now having hard time, but mutually help each other and support' into a sound signal through a TTS model, and output the signal through the speaker 110 in operation S57.

Meanwhile, in operation S57, only the part 'and support' excluding 'All of us,' 'are now having hard time, but,' and 'mutually help each other' that were previously output through the speaker 110 in operation S27, operation S37, and operation S47 may be converted into sound signals, and then output through the speaker 110.

FIG. 8 is a diagram for illustrating an End of Phrase (EOP) according to an embodiment of the disclosure.

FIG. 8 illustrates a table which organizes texts, translation texts, liberal translation texts, sentence similarity values, sentence suitability values, and outputs I each of Step 1 to Step 5 explained with reference to the flow charts in FIG. 3 to FIG. 7. Additionally, referring to the table in FIG. 8, an End of Phrase item is added, and hereinafter, an End of Phrase (hereinafter, referred to as an EOP) will be explained.

Referring to Step 2, the processor 130 according to an embodiment of the disclosure may input the first text which is a Korean text corresponding to 'We' and the second text which is a Korean text corresponding to 'All' into the third neural network model 3 and acquire information on whether the first and second texts correspond to a phrase. Then, the processor 130 may input the second translation text output by the first neural network model 1 and the information on whether the first and second texts correspond to a phrase output by the third neural network model 3 into the second neural network model 2, and acquire a second liberal translation text corresponding to the second translation text. Meanwhile, the third neural network model 3 may be a model trained to determine whether input texts correspond to a phrase.

According to an embodiment of the disclosure, if it is identified that the first and second texts correspond to a phrase based on the information input through the processor 130, the second neural network model 2 may output a second liberal translation text corresponding to the second translation text and in the form of a sentence or in the form of a phrase. As another example, if it is identified that the first and second texts do not correspond to a phrase, the second neural network model 2 may output a second liberal translation text corresponding to the second translation text and in the form of an uncompleted sentence.

Referring to FIG. 8, in Step 2, the processor 130 may identify whether the first text which is a Korean text corresponding to 'We' and the second text which is a Korean text corresponding to 'All' correspond to a phrase, and then input the identification result and the second translation text 'All of us' into the second neural network model 2.

Then, if the first and second texts do not correspond to a phrase, the second neural network model 2 may output a second liberal translation text corresponding to the second translation text such that the degree of freedom of the sentence is high. For example, if the first and second texts do not correspond to a phrase, the second neural network model 2 may make the second liberal translation text corresponding to the second translation text not include a sentence-closing ending, or make the text not ended with a period (.) or a comma (,), and thereby heighten the degree of freedom of the second liberal translation text. That is, if the first and second texts do not correspond to a phrase, the second neural network model 2 may output a second liberal translation text in the form of an uncompleted sentence.

As another example, referring to Step 3 in FIG. 8, the processor 130 may identify whether the first text which is a Korean text corresponding to 'We,' the second text which is a Korean text corresponding to 'All,' and the third text which is a Korean text corresponding to 'It's difficult time, but' correspond to a phrase, and then input the identification result and a third translation text 'It's a difficult time for everyone, but' into the second neural network model 2.

Then, if the first to third texts correspond to a phrase, the second neural network model 2 may output a third liberal translation text corresponding to the third translation text such that the degree of freedom of the sentence is low. For example, if the first to third texts correspond to a phrase, the second neural network model 2 may make the third liberal translation text corresponding to the third translation text ended with a sentence-closing ending, or a period or a comma (or make the text include a sentence-closing ending, a period, or a comma), and thereby lower the degree of freedom of the third liberal translation text. That is, if the first to third texts correspond to a phrase, the second neural network model 2 may output a third liberal translation text in the form of a sentence or in the form of a phrase.

Outputs of each of the first neural network model 1, the second neural network model 2, and the third neural network model 3 will be explained with reference to FIG. 9.

FIG. 9 is a flow chart for illustrating a process of a third neural network model according to an embodiment of the disclosure.

FIG. 9 is a flow chart for illustrating in detail the output of the third neural network model 3 based on Step 4 in the table in FIG. 8. FIG. 9 corresponds to Step 4 in FIG. 8, and it is assumed that the fourth word among a plurality of words constituting a sentence is received.

First, a case wherein the user uttered 'help each other' in the first language may be assumed. In this case, when the user voice, i.e., corresponding to 'help each other' is received through the microphone in operation S41, the processor 130 may perform voice recognition and acquire a fourth text 'help each other' in operation S42.

Then, the processor 130 may input the first text corresponding to 'We,' the second text corresponding to 'All,' the third text corresponding to 'It's difficult time, but,' and the fourth text corresponding to 'help each other' into the first neural network model 1, and acquire a fourth translation text 'It's difficult time for everyone, but let's help each other' in operation S43. The operations S41 to S43 are identical to what is illustrated in FIG. 6.

The processor 130 according to an embodiment of the disclosure may input the first to fourth texts acquired in each of Step 1 to Step 4, i.e., 'It's difficult time for everyone, but let's help each other' into the third neural network model 3, and the third neural network model 3 may output information on whether the first to fourth texts correspond to a phrase in operation S48.

Then, the processor 130 may input the fourth translation text 'It's difficult time for everyone, but let's help each other' and the information on whether the first to fourth texts correspond to a phrase output by the third neural network model 3 into the second neural network model 2, and acquire a fourth liberal translation text 'All of us are now having hard time, but mutually help each other' in operation S44.

In particular, in operation S44, if it is identified that the first to fourth texts correspond to a phrase based on the information output by the third neural network model 3, the second neural network model 2 may output a fourth liberal translation text corresponding to the fourth translation text such that the degree of freedom of the sentence is low. For example, the second neural network model 2 may make the fourth liberal translation text corresponding to the fourth translation text ended with a sentence-closing ending, or a period or a comma (or make the text include a sentence-closing ending, a period, or a comma), and thereby lower the degree of freedom of the fourth liberal translation text.

As another example, if it is identified that the first to fourth texts do not correspond to a phrase based on the information output by the third neural network model 3, the second neural network model 2 may output a fourth liberal translation text corresponding to the fourth translation text such that the degree of freedom of the sentence is high.

In the flow chart illustrated in FIG. 9, the operations S45 to S47 are substantially the same as those explained in FIG. 6, and thus explanation in that regard will be omitted.

<Learning of the Second Neural Network Model>

Figure 10A:
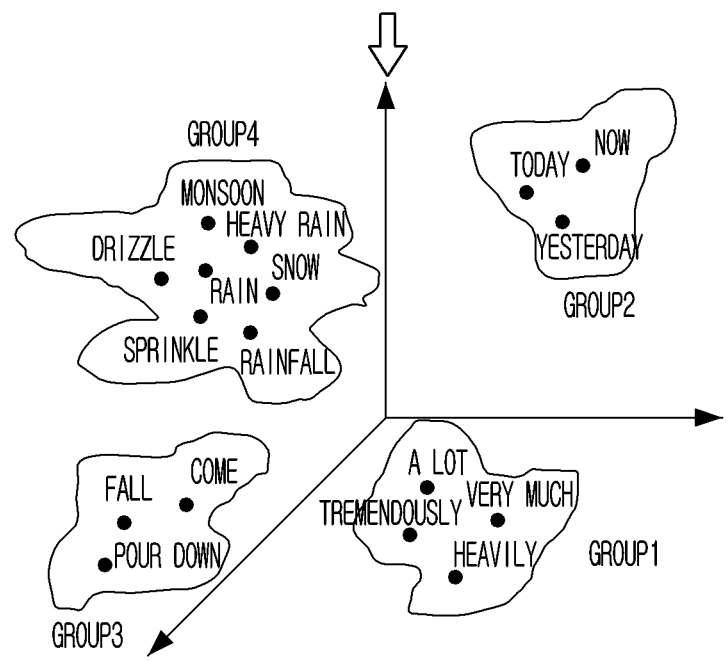
FIG. 10A is a diagram for illustrating a plurality of texts according to an embodiment of the disclosure.
Figure 10B:
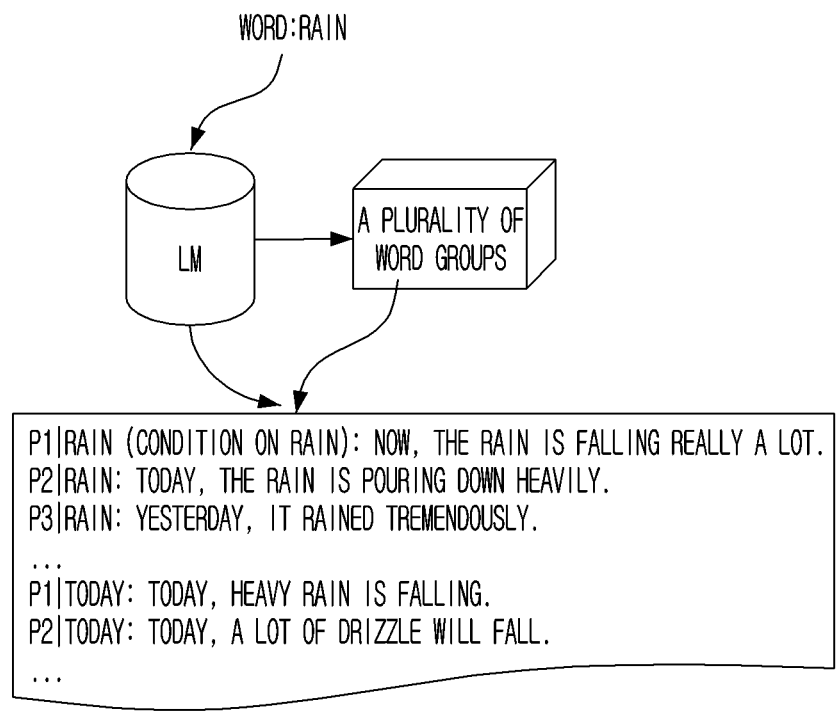
FIG. 10B is a diagram for illustrating a plurality of texts according to an embodiment of the disclosure.

FIG. 10A and FIG. 10B are diagrams for illustrating a plurality of texts according to an embodiment of the disclosure.

The second neural network model 2 that outputs a liberal translation text corresponding to an input text may be trained based on a plurality of texts.

For example, the processor 130 may acquire a plurality of learning texts by using a language model (LM). Here, a language model may mean an artificial intelligence model trained to acquire another sentence having similarity greater than or equal to a threshold value to an input sentence. A language model may be a sequence-to-sequence model, and the language model may include an encoder for processing of input data and a decoder for processing of output data.

Here, a sequence means continuous data that is interrelated, and a sentence such as the first sentence, the second sentence, and the third sentence in the disclosure may be regarded as an example of a sequence.

A language model may include an encoder for processing of input data and a decoder for processing of output data. Here, the encoder and the decoder may respectively include a plurality of recurrent neural network (RNN) cells. For example, the plurality of RNN cells may include a long short-term memory (LS™) or a gated recurrent unit (GRU).

The language model according to an embodiment of the disclosure receives a sampling sentence and an input sentence based on a mono corpus of the first language. Referring to FIG. 10sA, a sampling sentence text or a first sentence text S1 may be 'Today, the rain is falling really a lot.'

The first sentence text S1 may be divided into word units through tokenization. For example, the first sentence text S1 may be divided into 'today,' 'the rain,' 'really', 'a lot,' and 'falling.' Then, each divided word may be converted into a vector through word embedding. Then, each divided word converted into a vector becomes an input for each time-step for each RNN cell included in the language model. Then, each divided word is converted into a vector through word embedding and input into each RNN cell.

Meanwhile, the language model may identify a plurality of word groups including words similar to the respective words included in the first sentence text S1. That is, each of the plurality of word groups may mean a gathering of words of which sentence similarity values are greater than or equal to the first threshold value.

For example, the language model may identify a second group including 'now' and 'yesterday' which are similar words to 'today.' As another example, the language model may identify a fourth group including 'monsoon,' 'heavy rain,' 'drizzle,' 'snow,' 'sprinkle,' etc. which are similar words to 'rain.'

Then, the language model may acquire a first candidate sentence, a second candidate sentence, . . . , an nth candidate sentence corresponding to the first sentence text S1 based on the words selected in the plurality of respective word groups. For example, the language model may acquire a first candidate sentence 'Today, heavy rain is falling' and a second candidate sentence 'Now, the rain is falling heavily' corresponding to the first sentence text S1 'Today, the rain is falling really a lot.'

Specifically, the language model may complete a candidate sentence by fixing the front part of the candidate sentence based on any one word among the words included in the first sentence text S1, and using words selected from word groups corresponding to the respective remaining words.

For example, referring to FIG. 10B, the language model may acquire the first candidate sentence, . . . , the nth candidate sentence by locating 'today' among the words included in the first sentence text S1 in the very front, and using words selected from the word groups of each of 'the rain,' 'really,' 'a lot,' and 'falling.' For example, the language model may acquire the first candidate sentence 'Now, the rain is falling really a lot,' the second candidate sentence 'Today, heavy rain is falling,' the third candidate sentence 'Today, a lot of drizzle will fall,' etc.

Then, the language model may acquire a perplexity (PPL) value and a sentence similarity (Sim) value between the first sentence text S1 and the plurality of candidate sentences.

Referring to FIG. 10B, the language model may acquire a second sentence text of which perplexity value is smaller than a threshold value, and of which sentence similarity value is greater than or equal to the first threshold value among the plurality of candidate sentences. As a perplexity value is lower, it means that a prediction may be made for a text sentence with a higher probability. Thus, a language model including text sentences having low perplexity values may mean a good language model.

Then, the second neural network model may be trained to output a liberal translation text corresponding to an input text by using the first sentence text S1 and the second sentence text.

Figure 11A:
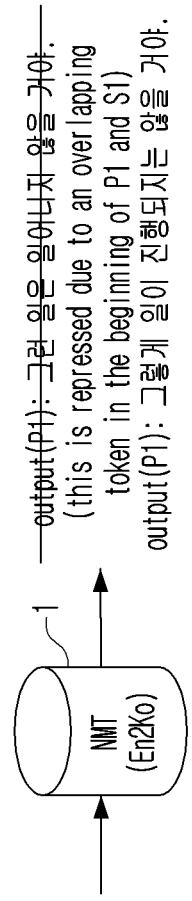
FIG. 11A is a diagram for illustrating a plurality of texts according to another embodiment of the disclosure.
Figure 11B:
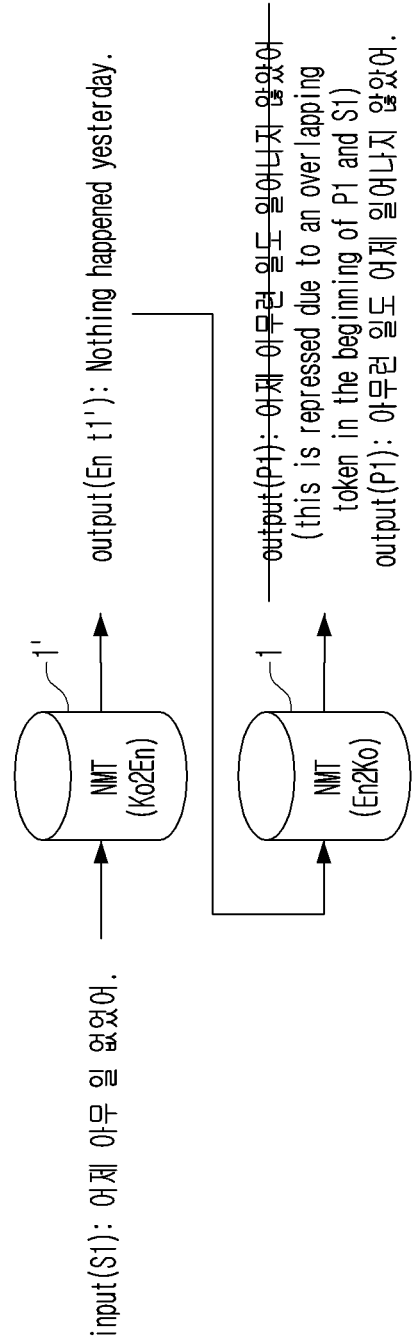
FIG. 11B is a diagram for illustrating a plurality of texts according to another embodiment of the disclosure.

FIG. 11A and FIG. 11B are diagrams for illustrating a plurality of texts according to another embodiment of the disclosure.

The processor 130 according to an embodiment of the disclosure may acquire a plurality of learning texts by using the first neural network model 1 (e.g., a neural machine translation (NMT) model).

For example, a neural machine translation model may be a model trained based on a parallel corpus. Here, a parallel corpus may be a corpus constituted in parallel such that sentences in different languages correspond to each other. The neural machine translation model may be trained based on a plurality of sentences included in a parallel corpus for translating a first language into a second language.

Referring to FIG. 11A, the processor 130 according to an embodiment of the disclosure may acquire a sentence text in the first language (e.g., English) and a first translation sentence text in the second language (e.g., Korean) corresponding to the sentence text in the first language based on a parallel corpus. For example, if a sentence text in the first language is 'That's not going to happen,' the processor 130 may acquire a first translation text P1 in the second language 'That's not going to happen' based on the parallel corpus.

Then, the processor 130 may input the first translation sentence text into the first neural network model 1 (the neural machine translation model), and acquire a second sentence text in the first language.

For example, if the first sentence text is 'That's not going to happen,' the second sentence text output by the first neural network model may be 'There's not going to be such a thing.'

The first neural network model 1 according to an embodiment of the disclosure may output a second sentence text such that the word located in the first position among the plurality of words included in the first sentence and the first word among the plurality of words included in the second sentence are different.

For example, referring to FIG. 11A, if the first sentence text S1 is 'That's not going to happen' in English, the first neural network model may output a second sentence text P1 'Things will not go on like that' in Korean which starts with a different word (i.e., the second sentence text does not start with Korean text corresponding to 'that's,' as in the first sentence text S1) and which corresponds to the first translation sentence text S1 'That's not going to happen.'

Then, the processor 130 may use the first sentence text S1 and the second sentence text P1 as learning texts of the second neural network model 2. Here, the first words among the plurality of words included in each of the first sentence text and the second sentence text may be different.

FIG. 11B is a diagram for illustrating a method of acquiring a plurality of texts according to still another embodiment of the disclosure.

Referring to FIG. 11B, the processor 130 may input the first sentence text S1 into a fourth neural network model 1' and acquire a first translation text t1' corresponding to the first sentence text S1. Here, the fourth neural network model may be a neural machine translation model that is trained to, if a text in the first language is input, output a translation text in the second language (e.g., translate Korean to English).

Then, the processor 130 may input the first translation text t1' into the first neural network model 1 and acquire a second sentence text P1 corresponding to the first translation text t1'. Here, the first neural network model 1 may be a neural machine translation model trained to, if a text in the second language is input, output a translation text in the first language (e.g., translate English to Korean).

Here, a sentence similarity value between the first sentence text S1 and the second sentence text P1 re-translated through the fourth neural network model 1' and the first neural network model 1 (e.g., a sentence text that was translated from the first language into the second language, and then translated from the second language into the first language) may be greater than or equal to the first threshold value.

For example, a case wherein the processor 130 acquired 'Yesterday, nothing happened' in 'Korean' as a first sentence text may be assumed. The processor 130 may input the first sentence text into the fourth neural network model 1' trained to translate from 'Korean' into 'English.' Then, the processor 130 may acquire 'Nothing happened yesterday' as a translation text from the fourth neural network model 1'.

Then, the processor 130 may input the translation text into the first neural network model 1 trained to translate from 'English' into 'Korean.'

The processor 130 according to an embodiment of the disclosure may acquire a re-translated sentence, i.e., a second sentence text from the second neural network model. According to an embodiment of the disclosure, if the first word among a plurality of words constituting the re-translated sentence is identical to the first word included in the first sentence text, the processor 130 may acquire a new re-translated sentence from the first neural network model 1. For example, the processor 130 may input 'Nothing happened yesterday' into the second neural machine translation model and acquire 'Yesterday, nothing happened' in Korean as a re-translated sentence. In this case, as the first word 'yesterday' of the re-translated sentence is identical to the first word 'yesterday' of the first sentence text, the processor 130 may acquire a new re-translated sentence through the first neural network model 1. For example, the first neural network model 1 may output a re-translated sentence which is semantically similar to the first sentence text, but of which first word is different. For example, the first neural network model 1 may output 'Nothing happened yesterday' in Korean.

Then, the processor 130 may train the second neural network model by using the first sentence text and the re-translated sentence, i.e., the second sentence text as learning texts.

As the second neural network model is trained by using two sentences of which first words (words that are located in the very front in the word order) are different but which are semantically similar as a pair, the second neural network model may be trained to output a liberal translation text which is semantically similar to a translation text and wherein a specific text (e.g., a liberal translation text previously output through the speaker 110) is located in the very front in the word order. The feature that an artificial intelligence model is trained means that a basic artificial intelligence model (e.g., an artificial intelligence model including any random parameters) is trained by using a plurality of training data by a learning algorithm, and a predefined operation rule or an artificial intelligence model set to perform a desired characteristic (or a purpose) is thereby made. Such learning may be performed through a separate server and/or a system, but the disclosure is not limited thereto, and the learning may be performed at the electronic device 100. As examples of learning algorithms, there are supervised learning, unsupervised learning, semi-supervised learning, transfer learning, or reinforcement learning, but learning algorithms are not limited to the aforementioned examples.

Here, each artificial intelligence model may be implemented as, for example, a convolutional neural network (CNN), a recurrent neural network (RNN), a Restricted Boltzmann Machine (RBM), a deep belief network (DBN), a bidirectional recurrent deep neural network (BRDNN), or deep Q-networks, etc., but is not limited thereto.

Returning to FIG. 1, the processor 130 for executing an artificial intelligence model according to an embodiment of the disclosure may be implemented as a generic-purpose processor such as a CPU, an AP, a digital signal processor (DSP), etc., a graphics-dedicated processor such as a GPU, a vision processing unit (VPU), etc., or through a combination of an artificial intelligence-dedicated processor such as an NPU and software. The processor 130 may perform control to process input data according to a predefined operation rule or an artificial intelligence model stored in the memory 120. Alternatively, in a case where the processor 130 is a dedicated processor (or an artificial intelligence-dedicated processor), the processor 130 may be designed as a hardware structure specified for processing of a specific artificial intelligence model. For example, hardware specified for processing of a specific artificial intelligence model may be designed as a hardware chip such as an ASIC, an FPGA, etc. In a case where the processor 130 is implemented as a dedicated processor, the processor 130 may be implemented to include a memory for implementing the embodiments of the disclosure, or implemented to include a memory processing function for using an external memory.

According to another embodiment of the disclosure, the memory 120 may store information on an artificial intelligence model including a plurality of layers. Here, the feature of storing information on an artificial intelligence model may mean storing various information related to operations of an artificial intelligence model, e.g., information on a plurality of layers included in an artificial intelligence model, information on parameters used in the plurality of respective layers (e.g., a filter coefficient, a bias, etc.), and the like.

A communication interface according to an embodiment of the disclosure receives inputs of various data. For example, the communication interface 110 may receive inputs of various data from an external device (e.g., a display device 200, a plurality of user terminals 10, 20, 30), an external storage medium (e.g., a USB memory), an external server (e.g., a webhard), etc. through communication methods such as Wi-Fi based on AP (Wi-Fi, a wireless LAN network), Bluetooth, Zigbee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), optical, coaxial, etc.

An inputter may receive a user input. For example, the inputter may include a microphone and receive a user's voice. As another example, the inputter may include a keyboard, a mouse, a keypad, a touch pad, etc., but the disclosure is not limited thereto.

A display may display various screens. The display may be implemented as a display including self-emitting diodes or a display including non-self-luminous diodes and a backlight. For example, the display may be implemented as various forms of displays such as a liquid crystal display (LCD), an organic light-emitting diodes (OLED) display, light-Emitting diodes (LED), a micro LED, a mini LED, a plasma display panel (PDP), a quantum dot (QD) display, quantum dot light-emitting diodes (QLED), etc. In the display 150, driving circuits that may be implemented in forms such as an a-si TFT, a low temperature poly silicon (LTPS) TFT, an organic TFT (OTFT), etc., a backlight unit, etc. may also be included. Meanwhile, the display 150 may be implemented as a touch screen combined with a touch sensor, a flexible display, a rollable display, a 3D display, a display to which a plurality of display modules are physically connected, etc.

Figure 12:
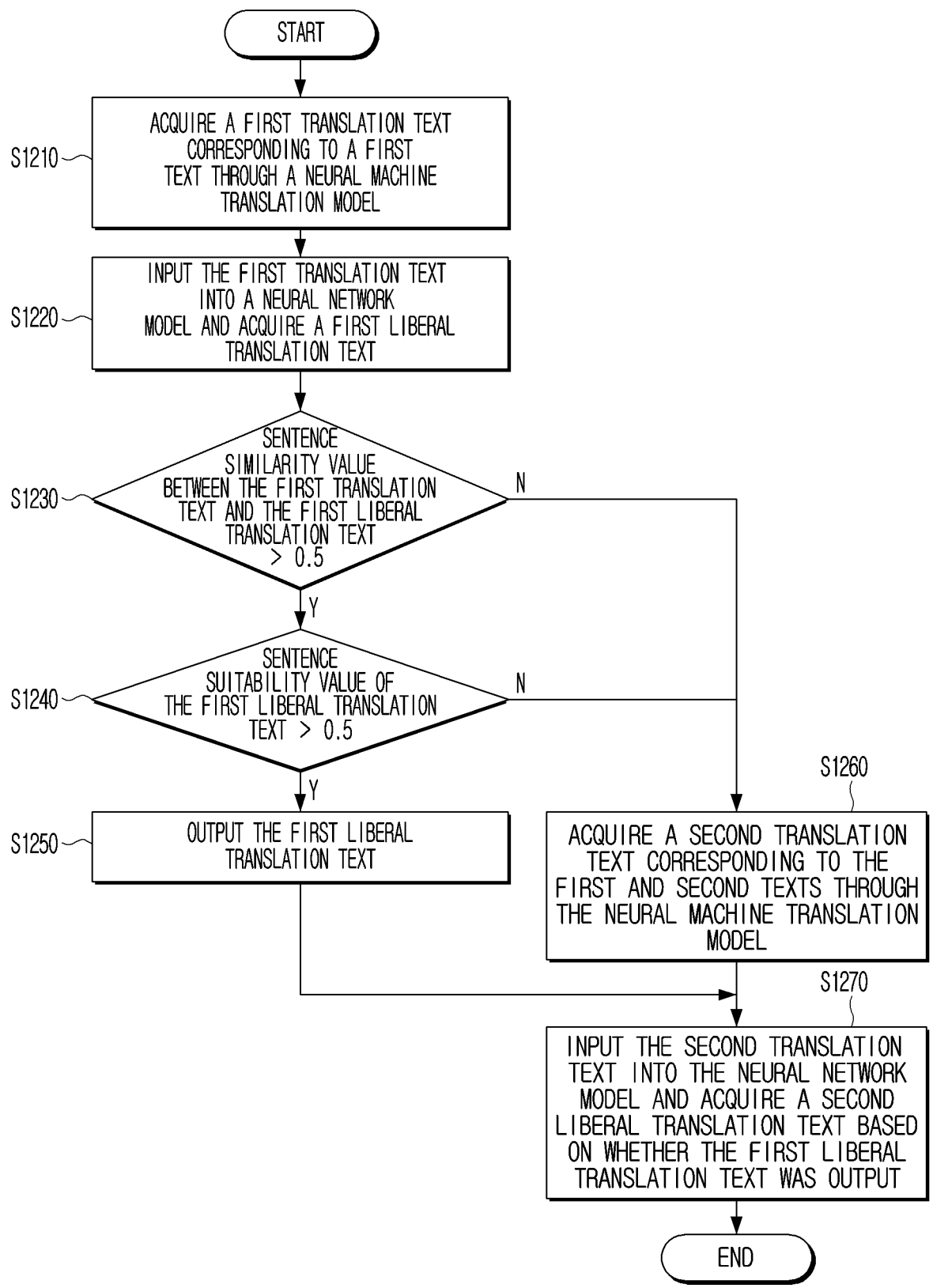
FIG. 12 is a flow chart for illustrating a control method of an electronic device according to an embodiment of the disclosure.

FIG. 12 is a flow chart for illustrating a control method of an electronic device according to an embodiment of the disclosure.

In the control method of an electronic device according to an embodiment of the disclosure, a first text in a first language is input into a first neural network model, and a first translation text in a second language corresponding to the first text is acquired in operation 1210.

Then, the first translation text is input into a second neural network model, and a first liberal translation text corresponding to the first translation text is acquired in operation S1220.

Then, it is identified whether the first liberal translation text may be output based on the first text and the first liberal translation text in operations S1230 and S1240.

Then, the first liberal translation text is output according to the identification result in operation S1250.

Then, if a second text is received subsequently to the first text, the first and second texts are input into the first neural network model, and a second translation text corresponding to the first and second texts is acquired in operation S1260. Then, the identification result and the second translation text are input into a second neural network model, and a second liberal translation text corresponding to the second translation text is acquired in operation S1270. Here, if it is identified that the first liberal translation text was output according to the identification result, the second neural network model outputs a second liberal translation text including the first liberal translation text and corresponding to the second translation text so that the first liberal translation text is located in the front in the word order, and if it is identified that the first liberal translation text was not previously output, the second neural network model outputs a second liberal translation text corresponding to the second translation text.

Here, in the step of identifying whether the first liberal translation text may be output, operation S1230 may include the steps of acquiring a sentence similarity value between the first translation text and the first liberal translation text and identifying whether the first liberal translation text may be output based on the acquired sentence similarity value, and the step of outputting the first liberal translation text may include the step of, if the sentence similarity value is greater than or equal to the first threshold value in operation S1230: Y, outputting the first liberal translation text.

Also, in the step of identifying whether the first liberal translation text may be output, operation S1240 may include the steps of acquiring a sentence suitability value of the first liberal translation text and identifying whether the first liberal translation text may be output based on the acquired sentence suitability value, and the step of outputting the first liberal translation text may include the step of, if the sentence suitability value is greater than or equal to the second threshold value in operation S1240: Y, outputting the first liberal translation text.

The control method according to an embodiment of the disclosure may further include the steps of identifying whether the second translation text may be output based on the second text and the second liberal translation text, based on identifying that the first liberal translation text was output, and the second liberal translation text may be output according to the identification result, outputting the remaining part excluding the first liberal translation text in the second liberal translation text, and based on identifying that the first liberal translation text was not output, and the second liberal translation text may be output, outputting the second liberal translation text.

Here, the step of identifying whether the second liberal translation text may be output may include the steps of acquiring a meaning similarity value between the second translation text and the second liberal translation text, acquiring a sentence suitability value of the second liberal translation text, and identifying whether the second liberal translation text may be output based on the meaning similarity value and the sentence suitability value, and the step of outputting the second liberal translation text may include the step of, based on the meaning similarity value being greater than or equal to the first threshold value and the sentence suitability value being greater than or equal to the second threshold value, outputting the second liberal translation text.

The control method according to an embodiment of the disclosure may further include the step of inputting the first and second texts into a third neural network model and acquiring information on whether the first and second texts correspond to a phrase, and operation S1270 of acquiring a second liberal translation text corresponding to the second translation text may include the step of inputting the second translation text and the information on whether the first and second texts correspond to a phrase into the second neural network model and acquiring the second liberal translation text corresponding to the second translation text.

Here, the second neural network model may, based on identifying that the first and second texts correspond to a phrase based on the input information, output the second liberal translation text corresponding to the second translation text and in the form of a sentence or a phrase, and based on identifying that the first and second texts do not correspond to a phrase, output the second liberal translation text corresponding to the second translation text and in the form of an uncompleted sentence.

Also, the second neural network model may be trained based on a plurality of texts, and the plurality of texts may include a first sentence text acquired based on at least one word selected from a plurality of respective word groups and a second sentence text of which sentence similarity value with the first sentence text is greater than or equal to the first threshold value, and the plurality of respective word groups may be gatherings of words of which sentence similarity values are greater than or equal to the first threshold value.

In addition, the second neural network model may be trained based on a plurality of texts, and the plurality of texts may include a first translation sentence text in a second language corresponding to a first sentence text in a first language acquired based on a parallel corpus between two different languages and a second translation sentence text in the second language acquired by inputting the first sentence text into the first neural network model, and a sentence similarity value between the first translation sentence text and the second translation sentence text may be greater than or equal to the first threshold value.

Here, the most preceding word among a plurality of words constituting the first translation sentence text and the most preceding word among a plurality of words constituting the second translation sentence text may be different words from each other.

The various embodiments of the disclosure may be applied not only to the electronic device according to the disclosure, but also to all electronic devices that may perform image processing such as a display device.

The aforementioned various embodiments of the disclosure may be implemented in a recording medium that may be read by a computer or a device similar to a computer by using software, hardware or a combination thereof. In some cases, the embodiments described in this specification may be implemented as the processor itself. According to implementation by software, the embodiments such as procedures and functions described in this specification may be implemented as separate software modules. Each of the software modules may perform one or more functions and operations described in this specification.

Computer instructions for performing processing operations of the acoustic output device 100 according to the aforementioned various embodiments of the disclosure may be stored in a non-transitory computer-readable medium. Computer instructions stored in such a non-transitory computer-readable medium make the processing operations at the acoustic output device 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

At least one of the components, elements, modules or units described herein may be embodied as various numbers of hardware, software and/or firmware structures that execute respective functions described above, according to an embodiment.

For example, at least one of these components, elements or units may use a direct circuit structure, such as a memory, a processor, a logic circuit, a look-up table, etc. that may execute the respective functions through controls of one or more microprocessors or other control apparatuses.

Also, at least one of these components, elements or units may be embodied by a module, a program, or a part of code, which contains one or more executable instructions for performing specified logic functions, and executed by one or more microprocessors or other control apparatuses.

Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units.

Also, at least part of functions of at least one of these components, elements or units may be performed by another of these components, element or units. Further, although a bus is not illustrated in the block diagrams, communication between the components, elements or units may be performed through the bus.

Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a speaker;
a memory configured to store at least one instruction; and
a processor electronically configured to execute the at least one instruction to:
input a first text in a first language into a first neural network model and acquire a first translation text corresponding to the first text, the first translation text being in a second language that is different from the first language;
input the first translation text into a second neural network model and acquire a first liberal translation text corresponding to the first translation text, the first liberal translation text being a text obtained by including at least one that is different from words included in the first translation text and/or rearranging words included in the first translation text;
identify whether the first liberal translation text is to be output based on a sentence similarity value between the first translation text and the first liberal translation text, and further based on a sentence suitability value of the first liberal translation text, to obtain a first identification result;
selectively control the speaker to output a sound corresponding to the first liberal translation text based on whether the first identification result indicates that the first liberal translation text is to be output;
based on a second text being received subsequently to the first text, input the first text and the second text into the first neural network model and acquire a second translation text corresponding to the first text and the second text; and
input the first identification result and the second translation text into the second neural network model and acquire a second liberal translation text corresponding to the second translation text, the second liberal translation text being a text obtained by including at least one that is different from words included in the second translation text and/or rearranging words included in the second translation text, and wherein the second neural network model is configured to:
  based on identifying that the sound corresponding to the first liberal translation text was previously output via the speaker, according to the first identification result, output the second liberal translation text corresponding to the second translation text, the second liberal translation text including the first liberal translation text, which is located in front in a word order in the second liberal translation text; and
  based on identifying that the sound corresponding to the first liberal translation text was not previously output via the speaker, according to the first identification result, output the second liberal translation text corresponding to the second translation text, the second liberal translation text not including the first liberal translation text in front in a word order in the second liberal translation text.

2. The electronic device of claim 1, wherein the processor is further configured to execute the at least one instruction to:
  based on the sentence similarity value being greater than or equal to a first threshold value, and further based on the sentence suitability value being greater than or equal to a second threshold value, control the speaker to output the sound corresponding to the first liberal translation text.

3. The electronic device of claim 1, wherein the processor is further configured to execute the at least one instruction to:
  identify whether the second liberal translation text is to be output based on the second text and the second liberal translation text to obtain a second identification result,
  based on identifying that the sound corresponding to the first liberal translation text was previously output via the speaker, and the second liberal translation text is to be output according to the second identification result, control the speaker to output a sound corresponding to a remaining part excluding the first liberal translation text in the second liberal translation text, and
  based on identifying that the sound corresponding to the first liberal translation text was not previously output via the speaker, and the second liberal translation text is to be output, control the speaker to output a sound corresponding to the second liberal translation text.

4. The electronic device of claim 3, wherein the processor is further configured to execute the at least one instruction to:
  acquire a sentence similarity value between the second translation text and the second liberal translation text,
  acquire a sentence suitability value of the second liberal translation text,
  identify whether the second liberal translation text is to be output based on the sentence similarity value between the second translation text and the second liberal translation text and the sentence suitability value, and
  based on the sentence similarity value between the second translation text and the second liberal translation text being greater than or equal to a third threshold value and the sentence suitability value being greater than or equal to a fourth threshold value, control the speaker to output the sound corresponding to the second liberal translation text.

5. The electronic device of claim 1, wherein the processor is further configured to execute the at least one instruction to:
  input the first text and the second text into a third neural network model and acquire information on whether the first text and the second text correspond to a phrase, and
  input the second translation text and the information on whether the first text and the second text correspond to the phrase into the second neural network model and acquire the second liberal translation text corresponding to the second translation text.

6. The electronic device of claim 5, wherein the second neural network model is further configured to:
  based on identifying that the first text and the second text correspond to the phrase based on the input information, output the second liberal translation text corresponding to the second translation text and in a form of a sentence or the phrase, and
  based on identifying that the first text and the second text do not correspond to the phrase, output the second liberal translation text corresponding to the second translation text and in a form of an uncompleted sentence.

7. The electronic device of claim 1, wherein the second neural network model is trained based on a plurality of texts, wherein the plurality of texts comprise:
  a first sentence text acquired based on at least one word selected from a plurality of respective word groups and a second sentence text of which sentence similarity value with respect to the first sentence text is greater than or equal to a fifth threshold value, and
  wherein the plurality of respective word groups include words of which sentence similarity values therebetween are greater than or equal to the fifth threshold value.

8. The electronic device of claim 1, wherein the second neural network model is trained based on a plurality of texts, wherein the plurality of texts comprise:
  a first translation sentence text in the second language corresponding to a first sentence text in the first language acquired based on a parallel corpus between the first language and the second language; and
  a second translation sentence text in the second language acquired by inputting the first sentence text into the first neural network model, and
  wherein a sentence similarity value between the first translation sentence text and the second translation sentence text is greater than or equal to a sixth threshold value.

9. The electronic device of claim 8, wherein a most preceding word among a plurality of words constituting the first translation sentence text and a most preceding word among a plurality of words constituting the second translation sentence text are different words from each other.

10. A control method of an electronic device, the control method comprising:
  inputting a first text in a first language into a first neural network model and acquiring a first translation text corresponding to the first text, the first translation text being in a second language that is different from the first language;
  inputting the first translation text into a second neural network model and acquiring a first liberal translation text corresponding to the first translation text, the first liberal translation text being a text obtained by including at least one that is different from words included in the first translation text and/or rearranging words included in the first translation text;
  identifying whether the first liberal translation text is to be output via a speaker based on a sentence similarity value between the first translation text and the first liberal translation text, and further based on a sentence suitability value of the first liberal translation text, to obtain a first identification result;

selectively controlling the speaker to output a sound corresponding to the first liberal translation text based on whether the first identification result indicates that the first liberal translation text is to be output;

based on a second text being received subsequently to the first text, inputting the first text and the second text into the first neural network model and acquiring a second translation text corresponding to the first text and the second text; and inputting the first identification result and the second translation text into the second neural network model and acquiring a second liberal translation text corresponding to the second translation text, the second liberal translation text being a text obtained by including at least one that is different from words included in the second translation text and/or rearranging words included in the second translation text, wherein the second neural network model is configured to:

based on identifying that the sound corresponding to the first liberal translation text was previously output via the speaker according to the first identification result, output the second liberal translation text corresponding to the second translation text, the second liberal translation text including the first liberal translation text, which is located in front in a word order in the second liberal translation text; and based on identifying that the sound corresponding to the first liberal translation text was not previously output via the speaker, output the second liberal translation text corresponding to the second translation text, the second liberal translation text not including the first liberal translation text in front in a word order in the second liberal translation text.

11. The control method of claim 10,
wherein the outputting the first liberal translation text comprises:
based on the sentence similarity value being greater than or equal to a first threshold value, and further based on the sentence suitability value being greater than or equal to a second threshold value, outputting the first liberal translation text.

12. The control method of claim 10, further comprising:
identifying whether the second liberal translation text is to be output based on the second text and the second liberal translation text to obtain a second identification result;
based on identifying that the sound corresponding to the first liberal translation text was previously output via the speaker, and the second liberal translation text is to be output according to the second identification result, outputting a remaining part excluding the first liberal translation text in the second liberal translation text; and
based on identifying that the sound corresponding to the first liberal translation text was not previously output via the speaker, and the second liberal translation text is to be output, outputting the second liberal translation text.

13. The control method of claim 12,
wherein the identifying whether the second liberal translation text is to be output comprises:

acquiring a sentence similarity value between the second translation text and the second liberal translation text;
acquiring a sentence suitability value of the second liberal translation text; and
identifying whether the second liberal translation text is to be output based on the sentence similarity value between the second translation text and the second liberal translation text and the sentence suitability value, and
wherein the outputting the second liberal translation text comprises:
based on the sentence similarity value between the second translation text and the second liberal translation text being greater than or equal to a third threshold value and the sentence suitability value being greater than or equal to a fourth threshold value, outputting the second liberal translation text.

14. The control method of claim 10, further comprising:
inputting the first text and the second text into a third neural network model and acquire information on whether the first text and the second text correspond to a phrase, and
wherein the identifying and acquiring the second liberal translation text corresponding to the second translation text comprises:
inputting the second translation text and the information on whether the first text and the second text correspond to the phrase into the second neural network model and acquiring the second liberal translation text corresponding to the second translation text.

15. The control method of claim 14, wherein the second neural network model is further configured to:
based on identifying that the first text and the second text correspond to the phrase based on the input information, output the second liberal translation text corresponding to the second translation text and in a form of a sentence or the phrase, and
based on identifying that the first text and the second text do not correspond to the phrase, output the second liberal translation text corresponding to the second translation text and in a form of an uncompleted sentence.

16. The control method of claim 10, wherein the second neural network model is trained based on a plurality of texts,
wherein the plurality of texts comprise:
a first sentence text acquired based on at least one word selected from a plurality of respective word groups and a second sentence text of which sentence similarity value with respect to the first sentence text is greater than or equal to a fifth threshold value, and
wherein the plurality of respective word groups include words of which sentence similarity values therebetween are greater than or equal to the fifth threshold value.

17. The control method of claim 10, wherein the second neural network model is trained based on a plurality of texts,
wherein the plurality of texts comprise:
a first translation sentence text in the second language corresponding to a first sentence text in the first language acquired based on a parallel corpus between the first language and the second language; and
a second translation sentence text in the second language acquired by inputting the first sentence text into the first neural network model, and wherein a sentence similarity value between the first translation sentence text and the second translation sentence text is greater than or equal to a sixth threshold value.

18. The control method of claim 17, wherein a most preceding word among a plurality of words constituting the first translation sentence text and a most preceding word among a plurality of words constituting the second translation sentence text are different words from each other.

\* \* \* \* \*